(12) United States Patent
Brauch et al.

(10) Patent No.: US 10,675,562 B2
(45) Date of Patent: Jun. 9, 2020

(54) CLOG-RESISTANT INLET FOR A CONDUIT OF A WATER TREATMENT SYSTEM

(71) Applicant: Meurer Research, Inc., Golden, CO (US)

(72) Inventors: Joseph K. Brauch, Aurora, CO (US); Christopher D. Hanson, Arvada, CO (US)

(73) Assignee: Meurer Research, Inc., Golden, CO (US)

( * ) Notice: Subject to any disclaimer, the term of this patent is extended or adjusted under 35 U.S.C. 154(b) by 64 days.

(21) Appl. No.: 16/144,645

(22) Filed: Sep. 27, 2018

(65) Prior Publication Data

US 2020/0101402 A1 Apr. 2, 2020

(51) Int. Cl.
*B01D 21/18* (2006.01)
*B01D 21/24* (2006.01)
(Continued)

(52) U.S. Cl.
CPC ......... *B01D 21/2472* (2013.01); *B01D 21/18* (2013.01); *B01D 21/20* (2013.01);
(Continued)

(58) Field of Classification Search
CPC ........ B01D 21/04; B01D 21/12; B01D 21/18; B01D 21/245; B01D 21/2477
(Continued)

(56) References Cited

U.S. PATENT DOCUMENTS 630,962 A 8/1899 Wood
1,918,742 A 7/1933 Elrod
(Continued)

FOREIGN PATENT DOCUMENTS

EP 0544096 6/1993
EP 2335799 6/2011
(Continued)

OTHER PUBLICATIONS

U.S. Appl. No. 29/664,788, filed Sep. 27, 2018, Brauch et al.

*Primary Examiner* — Christopher Upton
(74) *Attorney, Agent, or Firm* — Sheridan Ross PC

(57) ABSTRACT

A nozzle is provided for a header conduit. The nozzle includes an inlet that is resistant to clogs caused by flat materials covering the inlet. The inlet generally includes multiple pathways to an elongated passageway through which waste liquid and sludge ("waste") are guided and enter the header conduit. In one embodiment, the elongated passageway is oriented to guide the waste along a path that is tangential to at least the inner surface of the header conduit which such incoming waste first contacts. When the conduit has an inner surface of circular cross-section, the passageway may optionally be elongated enough that the incoming waste enters the header conduit along a path tangential to the circular surface. To better assure axial flow of the waste in the conduit to an outlet, in one embodiment the passageway provides both the tangential flow and is at an acute angle to the longitudinal axis of the conduit. The incoming waste is thereby provided with an axial component. In this manner, the passageway assures that the energy and momentum of the incoming waste is helical in direction. The waste previously admitted into the header conduit is urged by the newly entering waste to continue to flow helically in the conduit. The passageways are provided at spaced intervals along the length of the conduit to collect sludge from a wide area of the bottom of the basin. Because of the tangential orientation of each of the passageways and the resulting initial tangential flow of the incoming waste, the waste incoming from each of those multiple passageways reinforces the existing helical flow of waste in the conduit.

20 Claims, 18 Drawing Sheets

(51) Int. Cl.
*B01D 21/20* (2006.01)
*C02F 1/00* (2006.01)

(52) U.S. Cl.
CPC ...... *B01D 21/245* (2013.01); *C02F 2001/007* (2013.01); *C02F 2301/026* (2013.01); *C02F 2303/24* (2013.01)

(58) Field of Classification Search
USPC .............................. 210/803, 523, 527, 528
See application file for complete search history.

(56) References Cited

U.S. PATENT DOCUMENTS

| | | | |
|---|---|---|---|
| 2,646,889 A | 7/1953 | Dulak | |
| 2,980,934 A | 4/1961 | Steindorf | |
| 3,333,704 A | 8/1967 | McGivern et al. | |
| 3,353,683 A | 11/1967 | Geiger | |
| 3,416,176 A | 12/1968 | Ravitts | |
| 3,494,462 A | 2/1970 | Baud | |
| 3,616,651 A | 11/1971 | Chang et al. | |
| 3,669,271 A | 6/1972 | McGivern | |
| 3,707,737 A | 1/1973 | Brower | |
| 3,797,664 A * | 3/1974 | Pentz | B01D 21/04 210/527 |
| 3,807,560 A * | 4/1974 | Pentz | B01D 21/04 210/527 |
| 3,959,838 A | 6/1976 | Hannah | |
| 4,090,966 A | 5/1978 | Clendenen | |
| 4,144,174 A | 3/1979 | Graham et al. | |
| 4,193,871 A | 3/1980 | White et al. | |
| 4,276,165 A | 6/1981 | Chamberlain | |
| 4,401,576 A | 8/1983 | Meurer | |
| 4,477,939 A | 10/1984 | White et al. | |
| 4,514,303 A | 4/1985 | Moore | |
| 4,551,246 A | 11/1985 | Coffing | |
| 4,555,340 A | 11/1985 | Boyle | |
| 5,047,150 A * | 9/1991 | Mitchell | B01D 21/18 210/527 |
| 5,059,312 A | 10/1991 | Galletti | |
| 5,108,586 A | 4/1992 | Iwashige et al. | |
| 5,366,638 A | 11/1994 | Moore | |
| 5,427,685 A | 6/1995 | Thorley | |
| 5,693,218 A | 12/1997 | Yamamoto et al. | |
| 5,911,241 A | 6/1999 | Roberts | |
| 5,914,049 A | 6/1999 | Brauch et al. | |
| 6,045,709 A | 4/2000 | Roberts | |
| 6,234,323 B1 | 5/2001 | Sarrouh | |
| 6,497,249 B1 | 12/2002 | Swan et al. | |
| 6,951,620 B2 | 10/2005 | Brauch et al. | |
| 7,021,472 B1 | 4/2006 | Meurer | |
| 7,159,724 B2 | 1/2007 | Brauch et al. | |
| 8,657,901 B2 | 2/2014 | Chapman | |
| 9,067,727 B2 | 6/2015 | Roberts et al. | |
| 9,764,257 B2 | 9/2017 | Dissinger | |
| 2001/0052493 A1 * | 12/2001 | Bryan | B01D 21/245 210/513 |
| 2004/0222170 A1 | 11/2004 | Hauge et al. | |
| 2006/0175251 A1 | 8/2006 | Roberts | |
| 2013/0118618 A1 | 5/2013 | Roberts | |

FOREIGN PATENT DOCUMENTS

| | | |
|---|---|---|
| WO | WO 98/012145 | 3/1998 |
| WO | WO 2011/067336 | 6/2011 |

* cited by examiner

CLOG-RESISTANT INLET FOR A CONDUIT OF A WATER TREATMENT SYSTEM

FIELD

This invention relates to removal of solids from liquid, and more particularly, to a clog-resistant inlet for a header conduit for removing the solids from the liquid contained in a basin of a water or waste water treatment facility.

BACKGROUND

Basins are used to collect certain materials and particles from liquid, to clarify the liquid. These materials are initially suspended in the liquid. They are subject to the force of gravity when the flow of the liquid is substantially reduced, as in a very low flow, or quiescent, zone (or flow channel) in the basin, and settle to the bottom of the basin. The settled materials and particles are removed from the bottom of the basin by being drawn into a header conduit that may traverse the bottom of the basin. Since these materials are generally solid and are said to "settle" out of the liquid, they are referred to as "settleable solids", or "settleable particulates". Upon settling onto the bottom they are generally referred to as "sludge". Such settleable solids may include naturally occurring materials (e.g., clay, silts, sand and dirt), chemical precipitants, biological solids, and stringy materials such as fibers. The words "material" or "solids" or "sludge" as used herein to describe the present invention refers to all such settleable solids and settleable particulates.

Basins are used, for example, in water and waste water treatment plants. In water treatment, the water drawn from a water supply has various non-settleable colloidal solids therein. When mixed with chemicals, the colloidal solids and chemicals agglomerate to form solids. In waste water treatment, the solids include organic solids, among other wastes. Water and waste water are treated in basins to remove such solids, thereby making the water clear and suitable for use, reuse, or for further treatment, such as tertiary treatment. The word "liquid" as used herein to describe the present invention refers to water and waste water.

An object of water and waste water basins is to create the quiescent zones having low flow rates to promote maximum settlement of the solids to the bottom of the basins. Typically, basins include a large area for containing the liquid and the solids where the settlement of the solids occurs. Such settlement has been promoted in small area basins by use of plate or tube settlers. Regardless of how the solids are caused to settle from the liquid in the basin, there is a need to remove the settled settleable solids and settleable particulates (i.e., the sludge) from the basin to provide room for additional solids and particulates which settle.

Various devices have been used in basins to remove the sludge from the basin. Among these are the well-known reciprocating sludge collector described in U.S. Pat. No. 4,401,576 which is incorporated herein by reference in its entirety. Other sludge collectors have been mounted to pivot on an axis at the center of a circular basin. Whether the collector reciprocates or rotates on an axis in the basin, a header conduit of the collector is generally caused to move relative to the bottom of the basin into the sludge which collects on the bottom. Negative pressure is applied to one end, or to a central point, of the header conduit in an attempt to cause the liquid and the sludge to flow from the bottom of the basin and enter apertures formed through the wall of the header conduit. The apertures are generally formed by removing a portion of the wall of the header conduit, which is typically a cylindrical pipe or a triangular cross-section conduit made from 14 gauge (75 mil) material. The liquid and the sludge enter the pipe in the direction of a diameter of the pipe, and for sludge removal must eventually turn so as to flow axially in the header conduit toward the downstream point at which the negative pressure is applied to the pipe. Despite some developments in removal of sludge from basins, problems have been experienced in attempting to efficiently remove the sludge from the basin using such header conduits.

SUMMARY

Applicants' studies of these problems indicates that the flow of sludge into such header conduits has often become blocked upstream of the header conduit as the header conduits are moved into the sludge. The movement tends to compact the sludge ahead of the header conduit, making it more difficult for the negative pressure applied to the header conduit to cause the sludge to move toward and into the apertures. This difficulty is compounded by the requirement that in prior header conduits having such apertures, the incoming liquid and sludge must abruptly turn from the diametrical path and change direction under the action of the lower pressure liquid and the sludge previously admitted into the header conduit. This change in direction dissipates some of the kinetic energy of the incoming liquid and sludge. As a result, back pressure tends to build up at the entrance to the aperture, the flow of sludge into the header conduit slows, and the sludge tends to pile up in front of the header conduit. In header conduits having the basin, the sludge has been observed flowing over the header conduit to the rear of the header conduit, where it is less compacted and tends to flow down and into the aperture through what is a path of least resistance to the apertures.

This approach to sludge collection is inherently subject to inefficiencies because, for example, the build up of sludge in front of the header conduit increases the energy needed to move the header conduit through the sludge, rendering the sludge collection operation more costly.

Applicants' have further determined that the apertures of such header conduits tend to become clogged with sludge. For example, in the treatment of waste liquids from so-called stone-washing operations performed on denim clothing, fibers from the denim material are dislodged from the clothing and have to be removed. These fibers are long, such as two inches. As the header conduit is moved into the sludge, including into the fibers, and with the negative pressure applied to the header conduit, the fibers flow toward the apertures and for sludge removal must turn just downward of the aperture at a right angle so as to flow into the axial length of the conduit. Due to the length of the fibers, and other factors, a fiber often becomes caught on the edge of the apertures, and causes other solids to collect there, thus clogging the aperture.

Inlets to the apertures of the header conduit may also be blocked by flat pieces of material, such as leaves, paper, or plastic, in the basin. As the sludge, including the flat material, flows toward the header conduit, the flat material may become lodged over an orifice of the aperture obstructing the flow of sludge into the header conduit.

Applicants have also studied the flow of such liquids and sludge in such header conduits. It appears to Applicants that the head loss in such header conduits varies from one axial location to another axial location in the header conduit as the flow of sludge and liquid moves downstream to the outlet to which the negative pressure is applied to the header conduit. This appears to cause fluctuations, or pulses, in the flow. These head loss variations appear to result from the liquid and the sludge entering the header conduit along such diametrical path, hitting against the wall of the header conduit opposite to the aperture, and forming a mushroom-shaped volume of higher pressure (as the velocity of the incoming liquid and sludge is converted to pressure), before tending to turn and flow toward such inlet of the header conduit. The presence of this higher pressure volume opposite to each aperture tends to restrict the rate of flow past each of the apertures, rendering the collection operation less efficient. Also, the varied pressure allows the sludge at the lower pressure locations to settle out of the flowing liquid and drop onto the bottom of the header conduit where it tends to come to a stop. Once stopped, it takes more energy to overcome the inertia of the stopped sludge, and the stopped sludge tends to accumulate more sludge, further decreasing the efficiency of the collection operation.

The present invention seeks to overcome these and other limitations of the prior header conduits by addressing each of the four above-discussed disadvantages of the prior header conduits. In particular, nozzles of some embodiments of the present invention are configured to direct liquids and the sludge to enter the header conduit along a well-defined path that is tangential to at least the inner surface of the header conduit which is first contacted by such incoming liquid and sludge upon entering the header conduit. In one embodiment, in which the header conduit has an inner surface of circular cross-section, the nozzle may direct such incoming liquid and sludge to enter the header conduit along such a path that is tangential to the circular surface. Applicant's studies indicate that the momentum of those incoming liquid and sludge in the tangential path causes them to immediately tend to assume a circular path within the header conduit, such that much of the velocity of the incoming liquid and sludge is retained. Rather than flowing into the header conduit and having to sharply turn, as with the apertures which have tended to block the easy flow into the header conduit and cause the sludge to pile up in front of the header conduit, the continued velocity of the incoming liquid and sludge encourages the sludge in front of the header conduit to enter the header conduit.

At the same time as such circular flow continues, the axial flow of the liquid and sludge previously admitted into the header conduit, or an axial force at the closed end of the header conduit, tends to cause the liquid and the sludge entering the conduit to have an axial component. As a result, those liquids and sludge newly admitted tangentially into the header conduit flow axially and circularly within the header conduit to the outlet, and retain much of the velocity they had when they entered the header conduit. Further, such tangential flow into the header conduit avoids catching the long fibers on an edge of the header conduit, avoiding a problem of the prior art apertures.

Moreover, as is known in the art, multiple places are provided for the liquid and the sludge to enter the header conduit. This is intended to assure removal of the sludge from all areas of the bottom of the basin. In one embodiment, the header conduit includes nozzles configured such that the liquid and the sludge entering the header conduit from each of those multiple places should reinforce, rather than hinder, the existing flow of the liquid and the sludge in the header conduit. Applicants' provision of such tangential flow into the header conduit tends to reinforce the circular flow in a circular cross-section header conduit, or in another conduit having generally circular flow. This is done by having the newly incoming tangential flow join in the circular direction with the circular and axial flow of the liquid and sludge previously admitted into the header conduit. This joining and resultant reinforced flow is contrary to the head loss periodically caused to occur in the prior art header conduits due to the mushrooming effect of the diametrically flowing liquid and sludge entering the header conduit through the spaced apertures. With the joined and resultant flow continuing generally with the same (or somewhat increased) velocity as the flow passes each point of tangential entry of the liquid and sludge into the header conduit, there are no places along the flow path to the outlet at which the sludge tends to settle out of the liquid.

With these and other features in mind, the header conduit of one embodiment of the present invention provides a nozzle (rather than an aperture) through which the liquid and the sludge are guided and enter the header conduit along a path that is tangential to at least the inner surface of the header conduit which such incoming liquid and sludge first contact upon entering the header conduit. When the header conduit has an inner surface of circular cross-section, the nozzle is elongated enough that the incoming liquid and sludge enter the header conduit along such path that is tangential to the circular surface. The nozzle organizes the incoming flow into the tangential path to assure that the momentum of those incoming liquid and sludge causes them to tend to assume a circular path within the header conduit. As a result, much of the velocity of the incoming liquid and sludge is retained. The continued velocity of the incoming liquid and sludge in the circular path avoids undue back pressure at the inlet of the nozzle and encourages the sludge in front of the header conduit to enter the header conduit.

At the same time as the nozzle directs the liquid and sludge into the header conduit in the tangential path and the circular flow thereof continues, the circular and axial flow (i.e., the helical flow) of the liquid and sludge which were previously directed into the header conduit tends to cause the liquid and the sludge that have newly entered the header conduit to develop an axial component so that the newly entered liquid and sludge join the helical flow of the previously admitted liquid and sludge. As a result, those liquids and sludge newly admitted into the header conduit flow axially and circularly (in a helical path) within the header conduit to the outlet, and retain much of the velocity they had when they entered the header conduit. Such tangential flow into the header conduit, followed by such helical flow, avoids catching the long fibers on an edge of the nozzle, avoiding a problem of the prior art apertures.

The nozzles also include inlets that are configured to be resistant to clogging and blocking by flat materials. Blocking of the nozzles is prevented by the geometry of the inlets. An inlet may include a plurality pathways leading to a passageway through the nozzle. If one inlet is obstructed, the flow of the liquid and sludge into the passageway and through the nozzle to the header conduit will continue through another one of the inlets. The inlets may also have a geometry that prevents complete blockages by flat material such that if a portion of an inlet is blocked, liquid and sludge can flow past the flat material and into the nozzle through an unblocked portion of the inlet, overcoming a problem of prior art header conduits.

The header conduit is designed to collect solids from a wide area of the bottom of the basin. Thus, the nozzles are provided at spaced intervals along the length of the header conduit for the liquid and the sludge to enter the header conduit and assure removal of the sludge from all areas of the bottom of the basin. Because of the tangential orientation of each of the nozzles of some embodiment of the present invention and the resulting initial tangential flow of the incoming liquid and sludge, the liquid and the sludge incoming from each of those multiple nozzles reinforces, rather than hinders, the existing circular and axial flow (i.e., helical) of liquid and sludge in the header conduit. Such reinforcement occurs in respect to the circular flow in a circular cross-section header conduit, and in other header conduits in which circular flow exists. The nozzle thus assures that the newly incoming flow joins in the circular direction with the helical flow of the liquid and sludge previously admitted into the header conduit. This reinforced flow is contrary to the head loss periodically caused to occur in the prior art header conduits.

With these features of the present invention in mind, it may be understood that one embodiment of the present invention contemplates having the liquids and the sludge enter the header conduit along a path that is tangential to at least the inner surface of the header conduit which such incoming liquid and sludge first contact upon entering the header conduit.

The present invention also contemplates providing a nozzle of another embodiment configured to direct the incoming liquid and sludge in a tangential path so that their momentum causes them to tend to assume a circular path within the header conduit, such that much of the velocity of the incoming liquid and sludge is retained.

The present invention further contemplates providing a nozzle according to one embodiment to admit the liquid and sludge in a circular flow in the header conduit, with helical flow of liquid and sludge previously admitted into the header conduit causing the liquid and the sludge that have newly entered the header conduit to develop an axial component so that the newly entered liquid and sludge join the helical flow of the previously admitted liquid and sludge.

The present invention further contemplates embodiments wherein those liquids and sludge newly directed into the header conduit flow in a helical path within the header conduit to an outlet and retain much of the velocity they had when they entered the header conduit.

The present invention further contemplates embodiments in which the liquid and the sludge incoming from each of multiple places along the header conduit reinforce, rather than hinder, the existing helical flow of liquid and sludge in the header conduit, wherein tangential flow of the incoming liquid and sludge tends to accomplish this reinforcement.

The present invention further contemplates embodiments having a nozzle not only positioned to provide tangential flow into the header conduit, but positioned at an acute angle with respect to the longitudinal axis of the header conduit to provide the incoming liquid and sludge with an axial component independently of previously admitted liquid and sludge.

The present invention further contemplates an embodiment in which such nozzle assures that the energy and momentum of the incoming liquid and sludge is both circular and axial in direction, or in other words, to assure helical flow of the incoming liquid and sludge.

The present invention also contemplates embodiments providing a nozzle resistant to blocking to assure that if a portion of an inlet of the nozzle is obstructed, liquid and sludge can enter the header conduit through an unobstructed portion of the inlet or through second inlet of the nozzle.

The present invention further contemplates one embodiment having a pair of header pipes mounted adjacently, and reciprocating the pipes along the bottom of a basin and alternately into the sludge, wherein a front of each pipe faces the sludge as that pipe is moved into the sludge. Each of the pipes is capable of supporting helical flow of liquid and sludge therein. In each front of each of the pipes there is a nozzle for directing flowing sludge and liquid into the pipe along a path that is tangential to the helical flow in the pipe.

One aspect is to provide a conduit for collecting material from a collector surface on which the material rests, the conduit having a collector section bounded by opposite closed ends, the collector section having an internal flow surface provided with an aperture formed through the internal flow surface for admitting the material, the internal flow surface being provided with a longitudinal axis extending between the opposite closed ends, the conduit comprising: a nozzle with a passageway intersecting the aperture and being external to the internal flow surface, the passageway being elongated and including an inlet that intersects two surfaces of the nozzle, the inlet being configured to reduce the likelihood of clogging due to flat material blocking the flow of the material through the inlet into the passageway. The flat material may comprise a leaf or a piece of plastic. In one embodiment, the passageway is oriented to intersect the internal flow surface tangentially.

In one embodiment, the inlet includes a first outer edge and a second outer edge that intersect the passageway. The first outer edge is in a first plane that is approximately perpendicular to a second plane including the second outer edge.

In one embodiment, the two surfaces of the nozzle that are intersected by the inlet comprise a first flat side and a second flat side. Optionally, the first flat side may be oriented generally perpendicular to a first radius of the conduit. Additionally, or alternatively, the second flat side is oriented generally perpendicular to a second radius of the conduit. Accordingly, in one embodiment of the present invention the first flat side is substantially perpendicular to the second flat side.

The passageway generally extends along a passageway axis. In one embodiment, the passageway axis is oriented at an acute angle with respect to the longitudinal axis. In one embodiment, the acute angle of the passageway axis is between approximately 40° and approximately 90° with respect to the longitudinal axis.

The conduit may optionally include a second nozzle with a second passageway. The second passageway is oriented to intersect a second aperture formed through the internal flow surface of the conduit. The second passageway generally extends along a second passageway axis that is oriented at a second acute angle with respect to the longitudinal axis. In one embodiment, the second acute angle of the second passageway is different than the acute angle of the passageway axis of the passageway.

Optionally, the aperture has a dimension of from approximately 0.25 inches to approximately 2 inches. In another embodiment, the passageway tangentially intersects the internal flow surface of the conduit.

The nozzle may comprise one or more of a polymer, a polyethylene, a high density polyethylene, a nylon, and similar materials. The nozzle can be interconnected or secured to the an exterior surface of the conduit. In one embodiment, the nozzle is secured to the conduit by a mechanical fastener such as but not limited to a bolt. Additionally, or alternatively, the nozzle can be secured to the conduit by a weld, a rivet, a screw, a bolt, a mechanical interlocking interface, an adhesive, or other known attachment methods.

Another aspect is to provide a method of collecting sludge from the bottom of a basin. The method generally comprises, but is not limited to, one or more of: (1) providing a sludge collection conduit with opposite ends, a sludge outlet between the opposite ends, and a cylindrical internal sludge collection surface extending along a longitudinal axis between the opposite ends of the sludge collection conduit and intersecting the sludge outlet; and (2) causing the sludge to enter the sludge collection conduit in paths through nozzles at a plurality of locations spaced along the sludge collection conduit between the opposite ends. Each nozzle of the sludge collection conduit has a passageway therein for directing the sludge in one of the paths from the basin into the sludge collection conduit. An inlet of the passageway of each nozzle intersects at least a first exterior flat side and a second exterior flat side of the nozzle. In this manner, the nozzle is configured to reduce the likelihood of clogging due to flat material blocking the entry of the sludge into the passageway.

In one embodiment, the first exterior flat side is approximately perpendicular to the second exterior flat side. Optionally, the paths through the nozzles are tangential to the cylindrical internal sludge collection surface. In another embodiment, the paths are at an acute angle with respect to the longitudinal axis. The paths are generally oriented to face the outlet to provide a helical flow of the sludge in the sludge collection conduit toward the sludge outlet.

The method may further include reducing a pressure applied to the sludge outlet. Reducing the pressure causes the sludge to flow from the basin into the passageway of the nozzle and from the passageway in the path tangential to the cylindrical internal sludge collection surface and at the acute angle with respect to the longitudinal axis.

Another aspect of the present invention is a flow director for collecting material from a surface of a collector and directing the material into a header conduit. The flow director includes, but is not limited to: (1) a body extending between a first endwall and a second endwall and including a first side, a second side, and a curved surface configured to be positioned adjacent to an exterior surface of the header conduit; (2) a passageway formed through the body and exiting through the curved surface, the passageway extending along a passageway axis that is oriented at an acute angle with respect to a longitudinal axis of the body; and (3) an inlet to the passageway that intersects the first and second sides. Because the inlet intersects the first and second sides, the likelihood of a leaf spanning the inlet and obstructing the flow of material through the inlet and into the passageway is reduced. In one embodiment, the curved surface is substantially evenly spaced from the longitudinal axis.

Optionally, the inlet may include a beveled edge. In one embodiment, the acute angle of the passageway axis with respect to the longitudinal axis is between approximately 40° and 90°. In another embodiment, the passageway is configured to direct the material into a helical path within the header conduit. Additionally, or alternatively, the curved surface may have a radius of curvature of between approximately 1 inch and approximately 2 inches.

In one embodiment, the first side is generally perpendicular to a first radius of the curved surface. Additionally, or alternatively, the second side may be oriented generally perpendicular to a second radius of the curved surface.

Yet another aspect of the present invention is a conduit configured to collect sludge from the bottom of a basin. The conduit comprises: (1) a cylindrical sidewall extending along a longitudinal axis between closed endwalls; (2) an outlet; and (3) a nozzle with a passageway configured to direct the sludge into the conduit, wherein the passageway includes an inlet that is configured to reduce the likelihood of blocking due to a flat objection contracting two surfaces of the nozzle. In one embodiment, the inlet includes a beveled edge. The nozzle may optionally be secured to the conduit by a bolt.

In one embodiment, the inlet intersects an upper flat side and a lower flat side of the nozzle. The upper flat side may be approximately perpendicular to the lower flat side.

In one embodiment, the passageway extends along a passageway axis that is oriented at an acute angle with respect to the longitudinal axis. Optionally, the passageway axis is oriented between approximately 40° and approximately 90° with respect to the longitudinal axis. In another embodiment, the passageway intersects the conduit tangentially to an internal surface of the conduit. Additionally, or alternatively, the passageway may be configured to direct the sludge into a helical path within the conduit.

In one embodiment, the nozzle generally includes a body defined by: (i) a first endwall; (ii) a second endwall; (iii) a curved surface configured to be positioned adjacent to an exterior surface of the conduit; (iv) a first flat surface; and (v) a second flat surface. In one embodiment, the first flat surface is substantially perpendicular to a first radius of the conduit. Additionally, or alternatively, the second flat surface may be substantially perpendicular to a second radius of the conduit. Optionally, in one embodiment the curved surface is substantially evenly spaced from the longitudinal axis.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

Unless otherwise indicated, all numbers expressing quantities, dimensions, conditions, and so forth used in the specification and claims are to be understood as being modified in all instances by the term "about" or "approximately." Accordingly, unless otherwise indicated, all numbers expressing quantities, dimensions, conditions, ratios, ranges, and so forth used in the specification and claims may be increased or decreased by approximately 5% to achieve satisfactory results. In addition, all ranges described herein may be reduced to any sub-range or portion of the range.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

Figure 1:
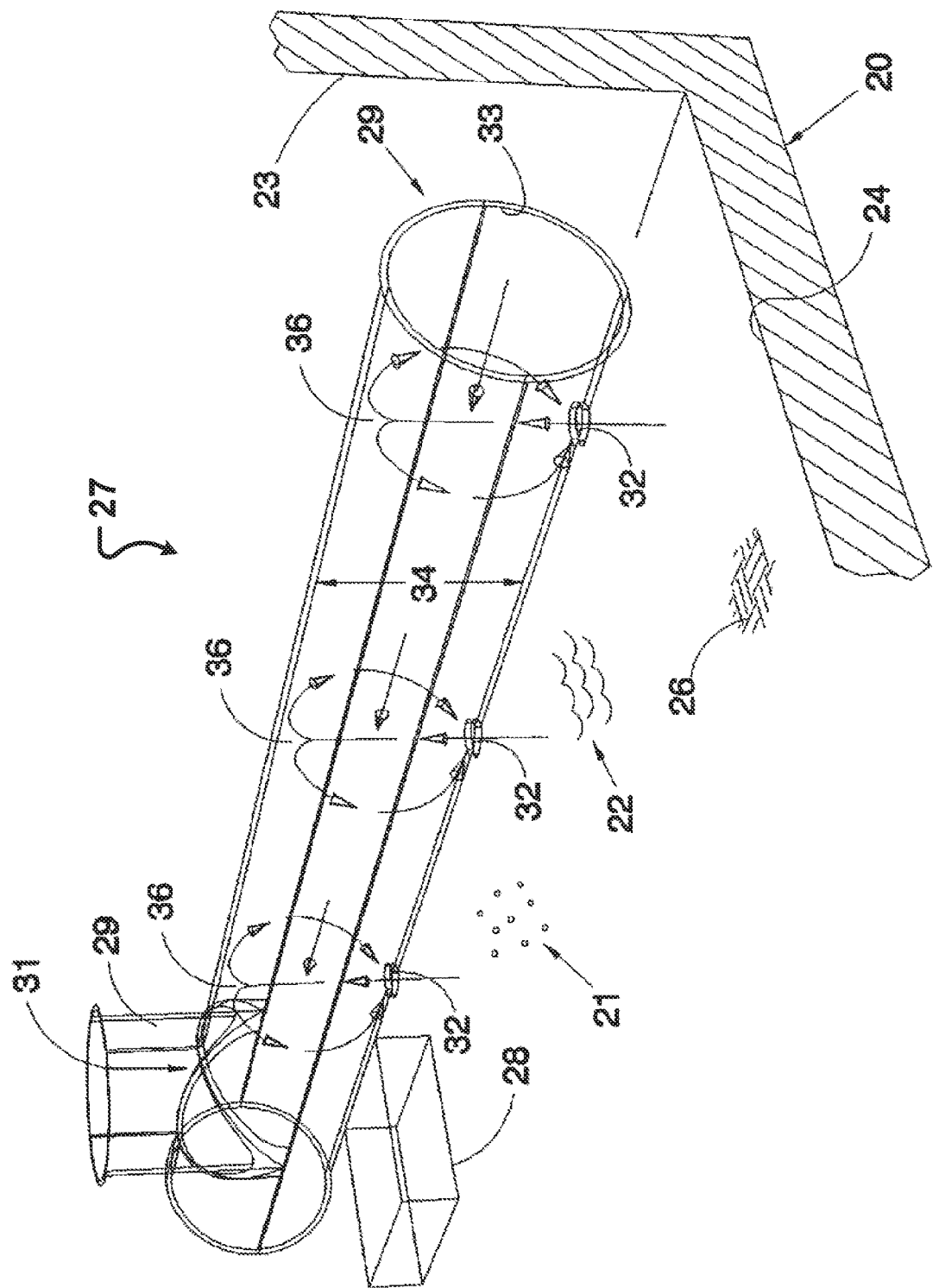
FIG. 1 is a three-dimensional view of a prior art header pipe showing liquid and material to be collected flowing in a straight path through an aperture in the pipe along a diameter of the pipe directly onto a wall of the pipe opposite to the aperture, and illustrating a mushroom effect of the incoming liquid and material to be collected as it hits the wall.

The drawings are not necessarily to scale. In certain instances, details that are not necessary for an understanding of the disclosure or that render other details difficult to perceive may have been omitted. It should be understood, of course, that the disclosure is not necessarily limited to the embodiments illustrated herein.

The following is a listing of components according to various embodiments of the present disclosure, and as shown in the drawings:

Number Component
20 Basin
21 Materials or settleable solids
22 Liquid
23 Wall of basin
24 Bottom of basin
26 Sludge
27 Device for removing sludge
28 Carriage
29 Header pipe
30 Longitudinal axis
31 Outlet
32 Aperture or entrance to a passageway
33 Wall of header pipe
34 Diameter
35 Passageway 36 Mushroom effect of liquid
39 Outlet of passageway
41 Header conduit
42 Entrances or orifices
43 Longitudinal axis
44 Interior flow surface
46 Closed ends
47 Central point
48 Main outlet
49 Pipe
50 Flat material
51 Entrance passageway
52 Tangential (or parallel) path of liquid and sludge
53 Portion of conduit
55 Tangent
56 Redirected flow
57 Curved or circular path
58 Outlet of a passageway
59 Helical flow
60 Axis of passageway
61 Angle
62 Flow
63 Thick section
64 Outer surface
71 Nozzle, port, orifice block, or flow director
72 Aperture
73 Line or axis parallel to longitudinal axis 43
74 Wall of header conduit
75 Endwall of nozzle
76 Curved surface of nozzle
77 Outer surface of header conduit
78 Flat sides of nozzle
79 Inlet
80 Corner
81 Curved outlet of passageway
82 Sludge removing device
84 Helical groove
86 Vane
88 Beveled edge
116 Front of header conduit
120 Fastener
122 Nut
124 Aperture for fastener
126 Radius of curvature
128 Height
130 Thickness
132 Length
134 Passageway width
136 Passageway height

DETAILED DESCRIPTION

Figure 2:
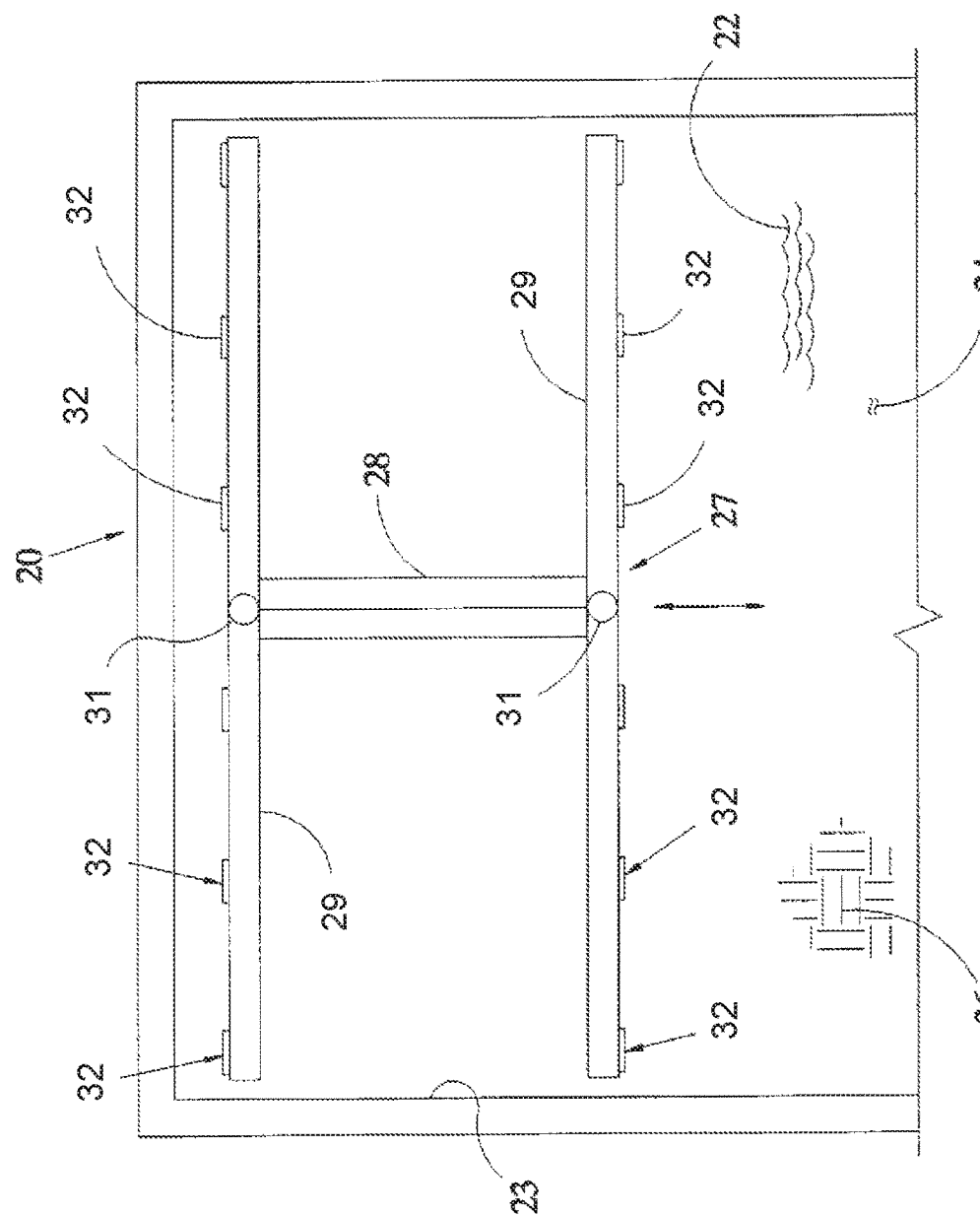
FIG. 2 is a plan view of a basin showing a traversing mechanism having a carriage movable from one of the ends of the basin to an opposite one of the ends of the basin to enable the header conduits to collect material and liquid from the basin.

Referring to FIGS. 1-2, basins 20 are shown for collecting materials 21 such as solids or particles from liquid or fluid, which is referred to as particle-laden liquid, or liquid 22. The solids may be settleable solids. The liquid 22 may be water or waste water, for example. The basin 20 has outer walls 23 and an open top (not shown) and a bottom 24. The outer walls 23 may be generally vertical. Basins 20 may be of any shape, such as rectangular, circular or square basins. By way of various devices such as tube settlers (not shown), the flow of the liquid 22 and the solids 21 through the basin 20 is substantially reduced so that the settleable solids 21 settle out of the liquid 22. The settled solids 21 settle to the bottom 24 for removal by a header conduit and system. As defined above, the settled solids 21 are referred to as "sludge" 26.

Various devices 27 (FIG. 2) may be used to remove the sludge 26 from the basin 20. The disclosure of U.S. Pat. No. 4,401,576 is incorporated herein by this reference as showing such a device 27. The reciprocating sludge removal system disclosed in the '576 patent moved a carriage 28 back and forth in the basin 20. Other sludge removal units (not shown) have been mounted in a circular basin to move a carriage 28 in a circular path. Whether the removal device 27 reciprocates a carriage 28 or rotates a carriage 28 on an axis in the basin 20, a header pipe 29 of the prior art device 27 (FIG. 1) is mounted on a carriage 28 that moves relative to the bottom 24 of the basin 20 into the sludge 26 which has collected on the bottom 24. Negative pressure is applied to an outlet 31 of the header pipe 29 in an attempt to cause the liquid 22 and the sludge 26 to flow from the bottom 24 of the basin 20 and enter apertures 32 formed through a wall 33 of the header pipe 29. The apertures 32 are generally formed by removing a portion of the wall 33 of the pipe 29, which is typically a cylindrical pipe or a triangular cross-section conduit made from 14 gauge (75 mil) material. In the prior art header pipe, the removed portion is generally at the bottom of the header pipe 29 and the liquid 22 and the sludge 26 enter the pipe 29 in the direction of a diameter 34 of the pipe 29. The wall 33 of the pipe 29 opposite to the aperture 32 causes the diametrically flowing liquid 22 and sludge 26 to split, to turn and reverse direction, forming a mushroom effect 36. The mushroom effect 36 tends to interfere with the desired turning of the liquid 22 and the sludge 26 to flow toward the downstream outlet 31 at which the negative pressure is applied to the pipe 29.

When the header pipe 29 has a triangular cross section (not shown), the apertures 32 are formed centrally in one bottom wall and the flow of the liquid 22 and the sludge 26 is into the pipe 29 toward an apex formed by the other two walls. This creates a mushroom effect similar to the mushroom effect 36, which also interferes with the desired turning of the liquid 22 and the sludge 26 to flow toward the downstream outlet 31 at which the negative pressure is applied to the pipe 29. Similarly, when the header pipe 29 has a rectangular or square cross section (not shown), the apertures 32 are formed centrally in one wall and the flow of the liquid 22 and the sludge 26 is into the pipe 29 toward the wall opposite to the apertures 32, creating a mushroom effect similar to the mushroom effect 36, which also interferes with the desired turning of the liquid 22 and the sludge 26 to flow toward the downstream outlet 31 at which the negative pressure is applied to the pipe 29.

Figure 3:
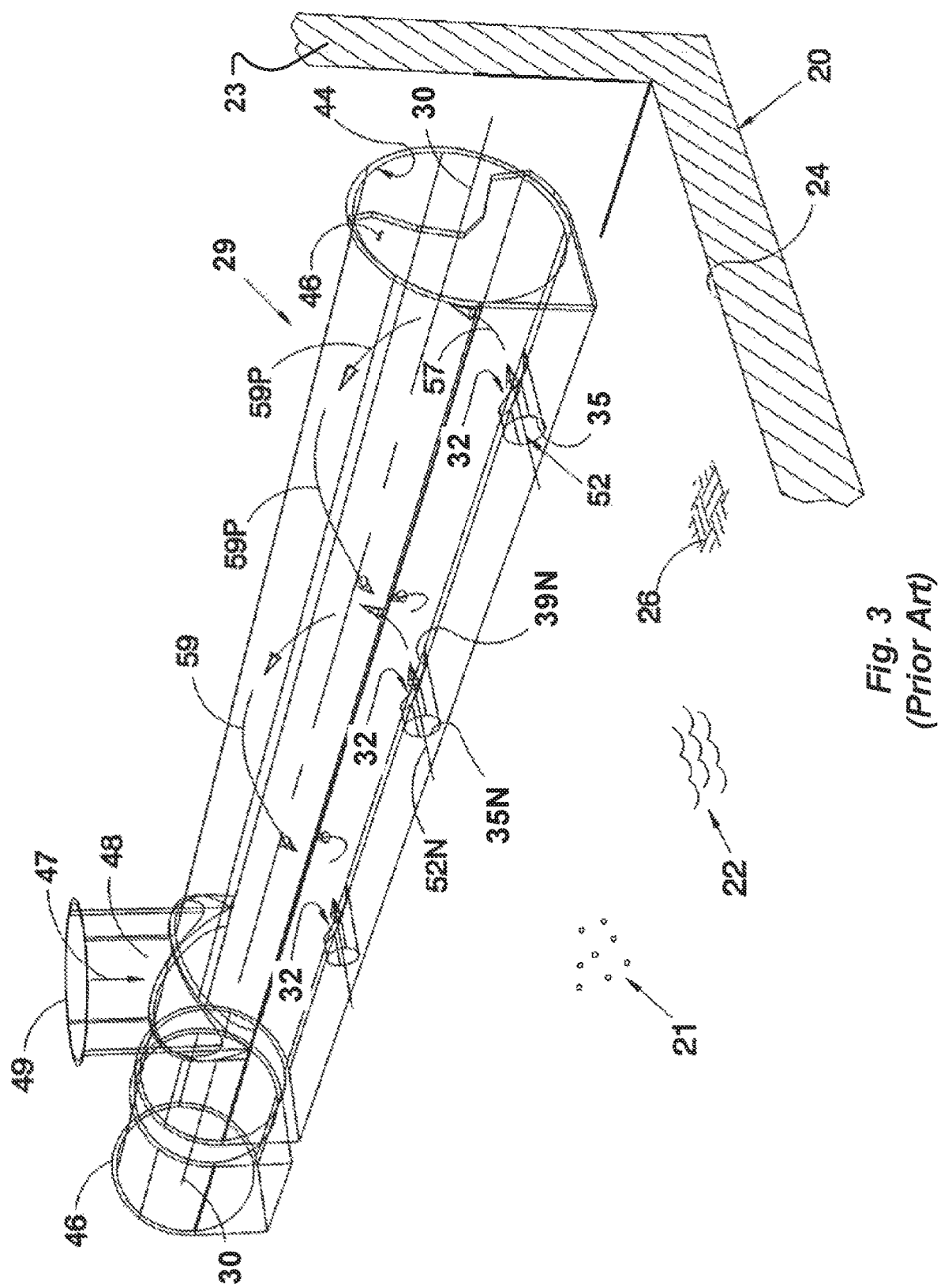
FIG. 3 is a three-dimensional view of a header conduit showing a nozzle section of the header conduit provided with a passageway for directing liquid and sludge to be collected in a straight path through an aperture in the pipe, wherein such path is tangential to a curved internal surface of the header conduit to promote flow of the material and the liquid in a circular path in the header conduit.

Prior art header pipes 29 shown in FIGS. 3-6 overcome at least some of the limitations of the header pipes such as the pipe 29 of FIG. 1. The header pipe 29 in FIG. 3 is shown having entrances 32 spaced along a longitudinal axis 30. The entrances 32 admit the liquid 22 and the sludge 26 to an inner or interior flow surface 44 extending from opposite, closed ends 46 to a central point 47 at which a main outlet 48 applies negative pressure. The negative pressure tends to cause the liquid 22 and the sludge 26 to flow into the entrances 32, from the entrances 32 to the outlet 48 into a pipe 49 which carries the liquid 22 and the sludge 46 from the basin 20.

The header pipe 29 is designed with the entrances 32 in the form of a passageway 35 through which the liquid 22 and the sludge 26 flow from the basin 20 into the pipe 29. The passageway 35 maintains the liquid 22 and the sludge 26 in a path 52 that is tangential to at least a portion 53 (FIG. 5) of the inner surface 44 of the pipe 29 which is first contacted by such incoming liquid 22 and sludge 26 upon entering the pipe 29.

Figure 5:
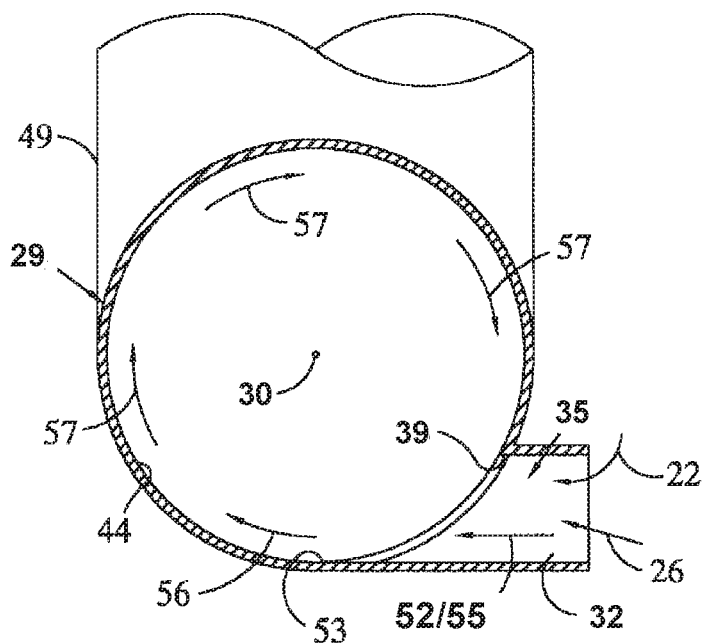
FIG. 5 is a cross sectional view taken on line 5-5 in FIG. 4 showing the tangential intersection of the passageway and the internal surface of the header conduit.

The pipe 29 is circular in cross section and the liquid 22 and the sludge 26 from the passageway 35 are discharged into the pipe 29 in the tangential path 52. As shown in FIG. 5, in each case the contact with that portion 53 of the inner surface 44 is generally parallel to the surface of the portion 53. For the circular cross section header pipe 29 shown in FIG. 3, such path 52 is on a tangent 55.

The circular pipe 29 is illustrated in FIG. 5 with the portion 53 of the circular inner surface 44 shown starting to redirect the incoming liquid 22 and the sludge 26 (shown by an arrow 56) into a circular or curved path 57 as it flows past an outlet 39 of the passageway 35 into the header pipe 29. The momentum of the incoming liquid 22 and sludge 26 in the tangential path 52, and the smooth transition thereof onto the inner flow surface 44 of the pipe 29, cause those incoming liquid 22 and sludge 26 to immediately tend to assume the circular path 57 within the pipe 29, such that much of the velocity of the incoming liquid 22 and sludge 26 is retained. The circular flow 57 continues through 360 degrees.

Referring to FIG. 3, the ends 46 are shown closed, so that there is no place for the circular flow (arrow 57) of the liquid 22 and the sludge 26 to flow but axially toward the main outlet 48. Thus, the flow (arrow 57) shown in FIG. 5 as being circular immediately adjacent to the outlet 39 of the passageway 35, becomes helical (see arrow 59) as shown in FIG. 3. The helical flow 59 has both a circular component and an axial component in the direction of the longitudinal axis 30 of the header pipe 29.

Figure 4:
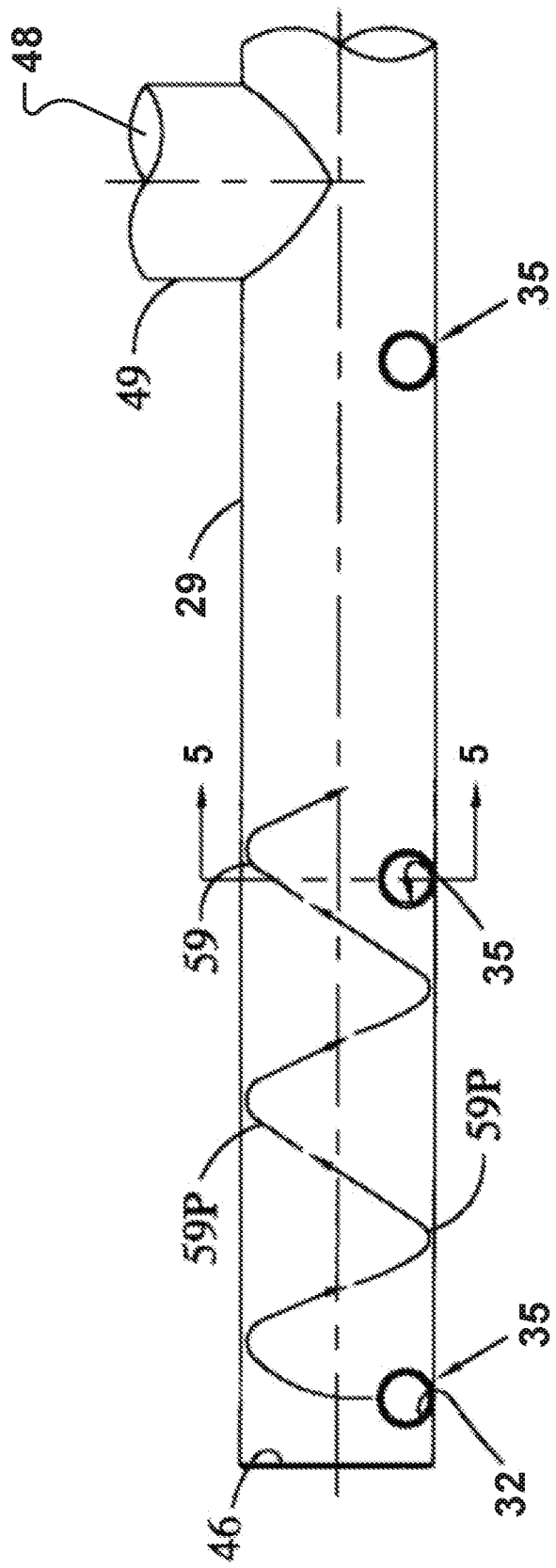
FIG. 4 is a front elevation view of the header conduit shown in FIG. 3.

As shown in FIG. 4, multiple passageways 35 are provided for the liquid 22 and the sludge 26 to enter the header pipe 29. This is intended to assure removal of the sludge 26 from all areas of the bottom 24 of the basin 20. The previously admitted liquid 22 and sludge 26 in the helical flow path 59 (shown as helical flow paths 59P) flow from the closed end 46 of the header pipe 29 circularly and axially toward the main outlet 48 of the header pipe 29 and past an outlet 39N (FIG. 3) of the next passageway 35N. At the passageway outlet 39N, the previously admitted liquid 22 and sludge 26 (arrows 59P in FIGS. 3 and 4) join the newly incoming liquid 22 and sludge 26 (shown by arrow 52N in FIG. 3). The helical direction of the flow 59P of the previously admitted liquid 22 and sludge 26 merges smoothly with the tangential flow 52N of the newly incoming liquid 22 and sludge 26, and reinforces that existing helical flow 59P. This joining of the flows 52N and 59P and resultant reinforced helical flow 59 is contrary to the head loss periodically caused to occur in the art pipes 29 illustrated in FIG. 1 due to the mushroom effect 36 of the diametrically flowing liquid 22 and sludge 26 entering the pipe 29 through the spaced apertures 32.

Figure 6:
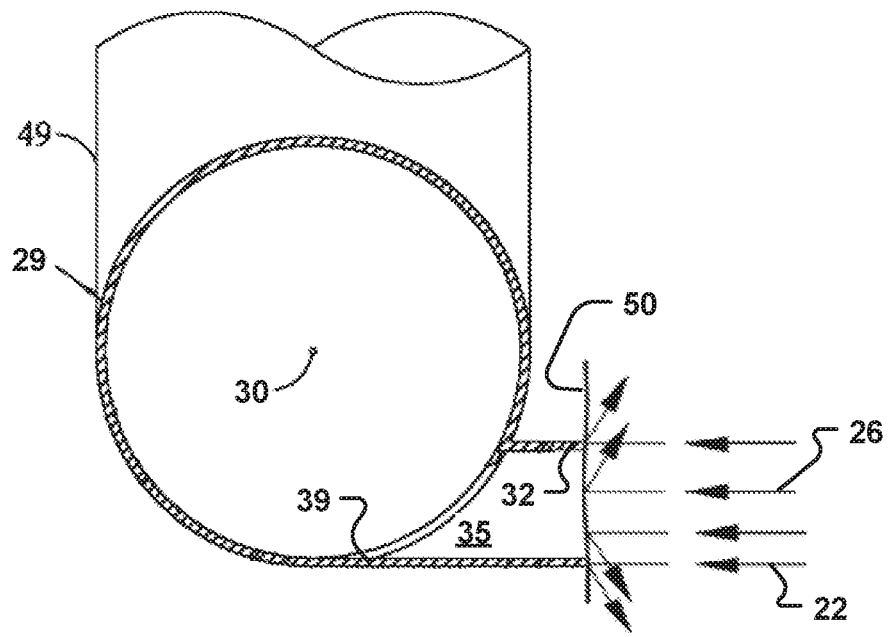
FIG. 6 is another cross sectional view similar to FIG. 5 and showing the header conduit with an inlet of the nozzle blocked by flat material.
Figure 7:
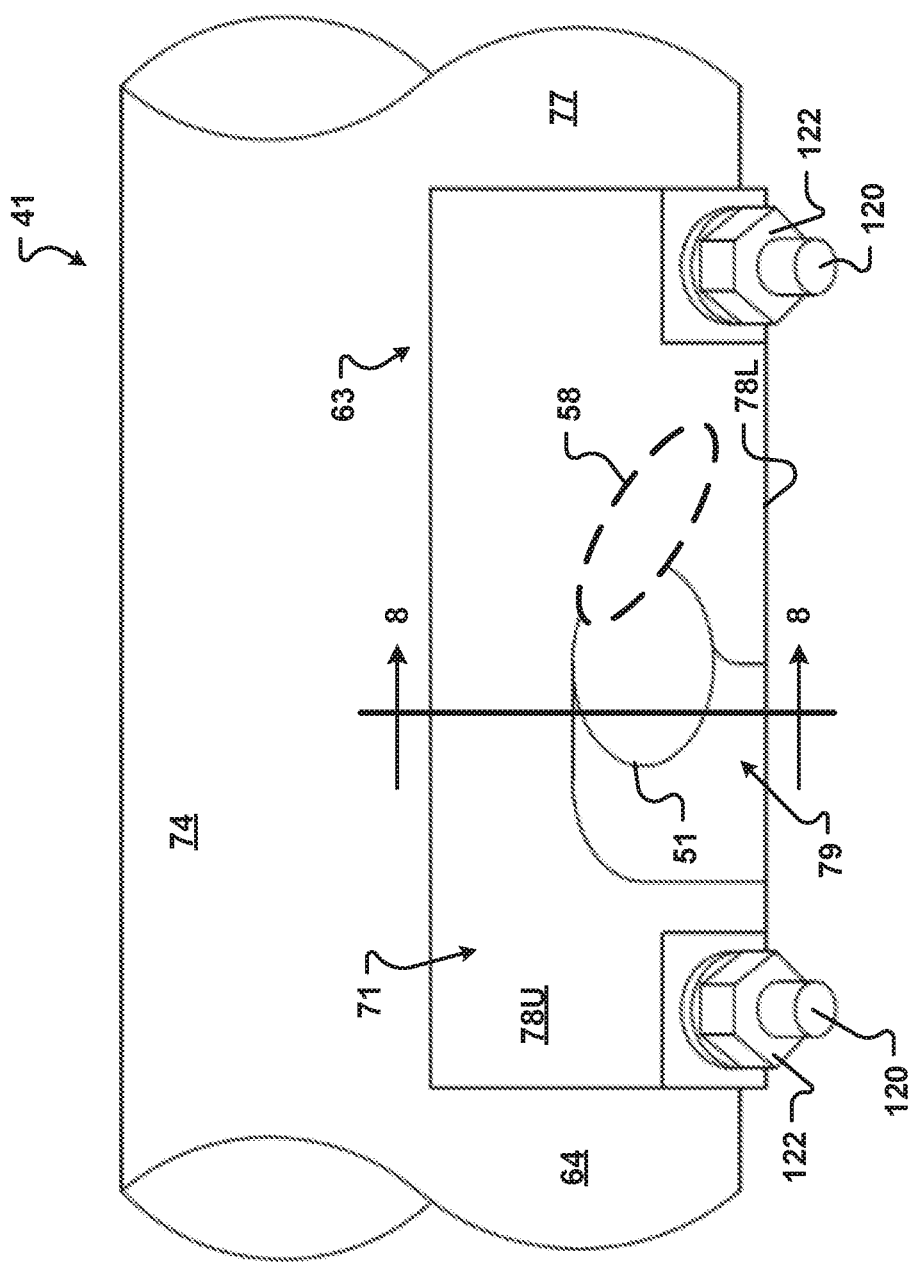
FIG. 7 is a front elevation view of a nozzle of an embodiment of the present invention in which the nozzle may be placed outside of a header conduit of the present invention to align a passageway with the aperture of the conduit yet direct the liquid and the sludge both tangentially and at an acute angle relative to a longitudinal axis of the header conduit to promote helical flow in the header conduit.

Referring now to FIG. 6, the orifice or entrance 32 to the passageway 35 of the prior art header pipe 29 may become blocked by flat material 50, such as a piece of plastic, a bag, a sheet of paper or a handi-wipe, a leaf, algae, and the like. The flat material 50 may cover the orifice 32, blocking or substantially reducing the flow of liquid 22 and sludge 26 into the header pipe 29. Generally, once the flat material 50 has covered the orifice 32, the sludge removal device 27 must be stopped to remove the flat material, decreasing the efficiency of the sludge collection operation and increasing costs.

Figure 8:
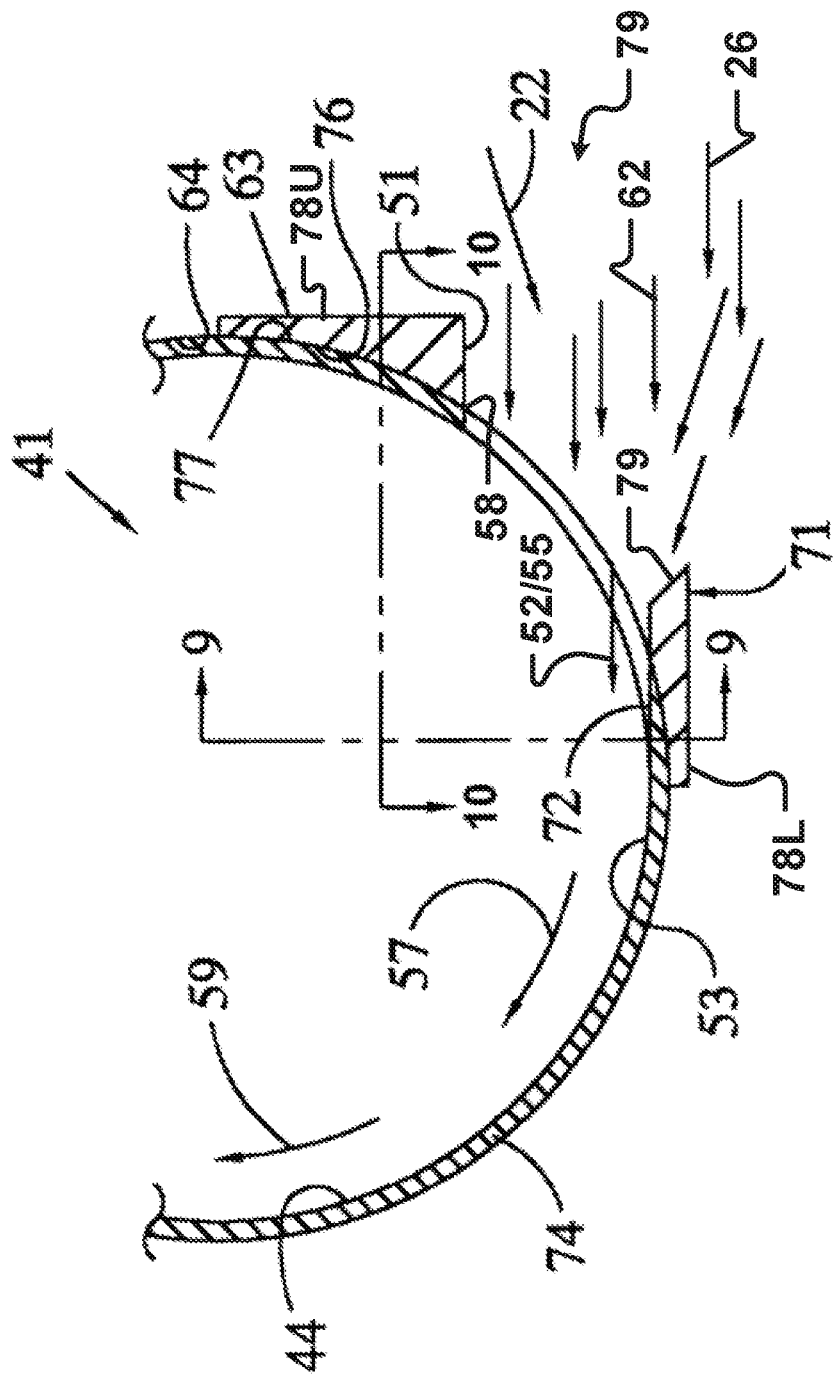
FIG. 8 is a cross sectional view of the nozzle taken along line 8-8 in FIG. 7, showing the passageway tangent to the internal surface of the header conduit.
Figure 9:
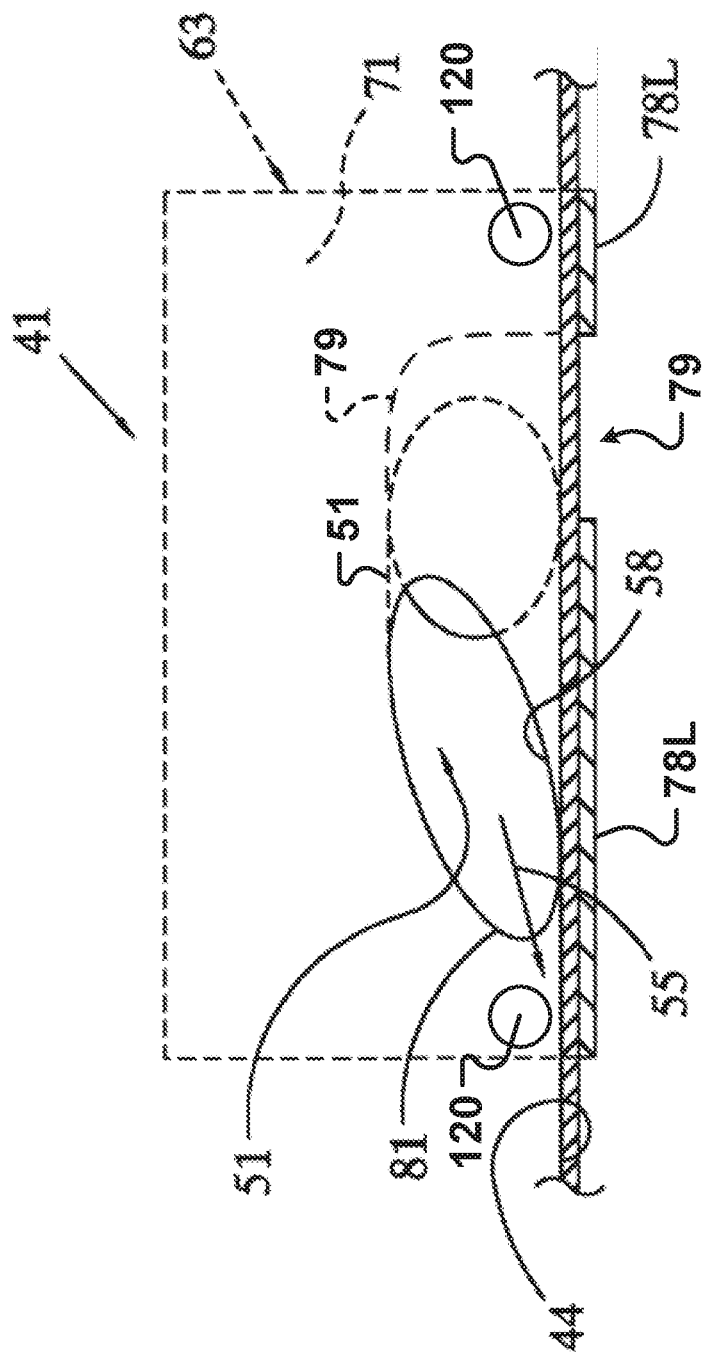
FIG. 9 is a cross sectional view taken along line 9-9 of FIG. 8 showing the passageway tangent to the internal surface of the header conduit.
Figure 10:
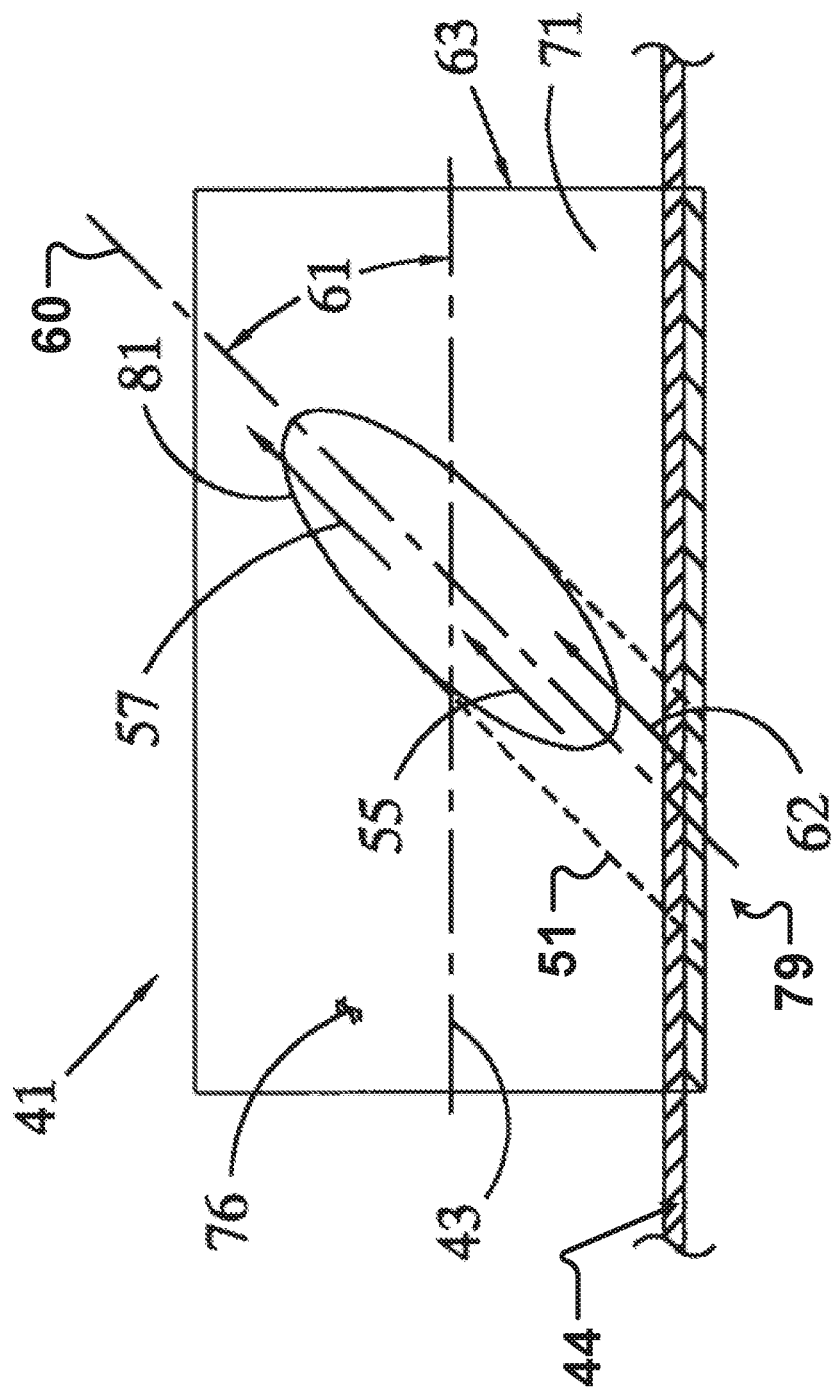
FIG. 10 is a cross sectional view of the nozzle of FIG. 7 taken along line 10-10 of FIG. 8 showing the acute angle of the passageway relative to the longitudinal axis of the header conduit.
Figure 11:
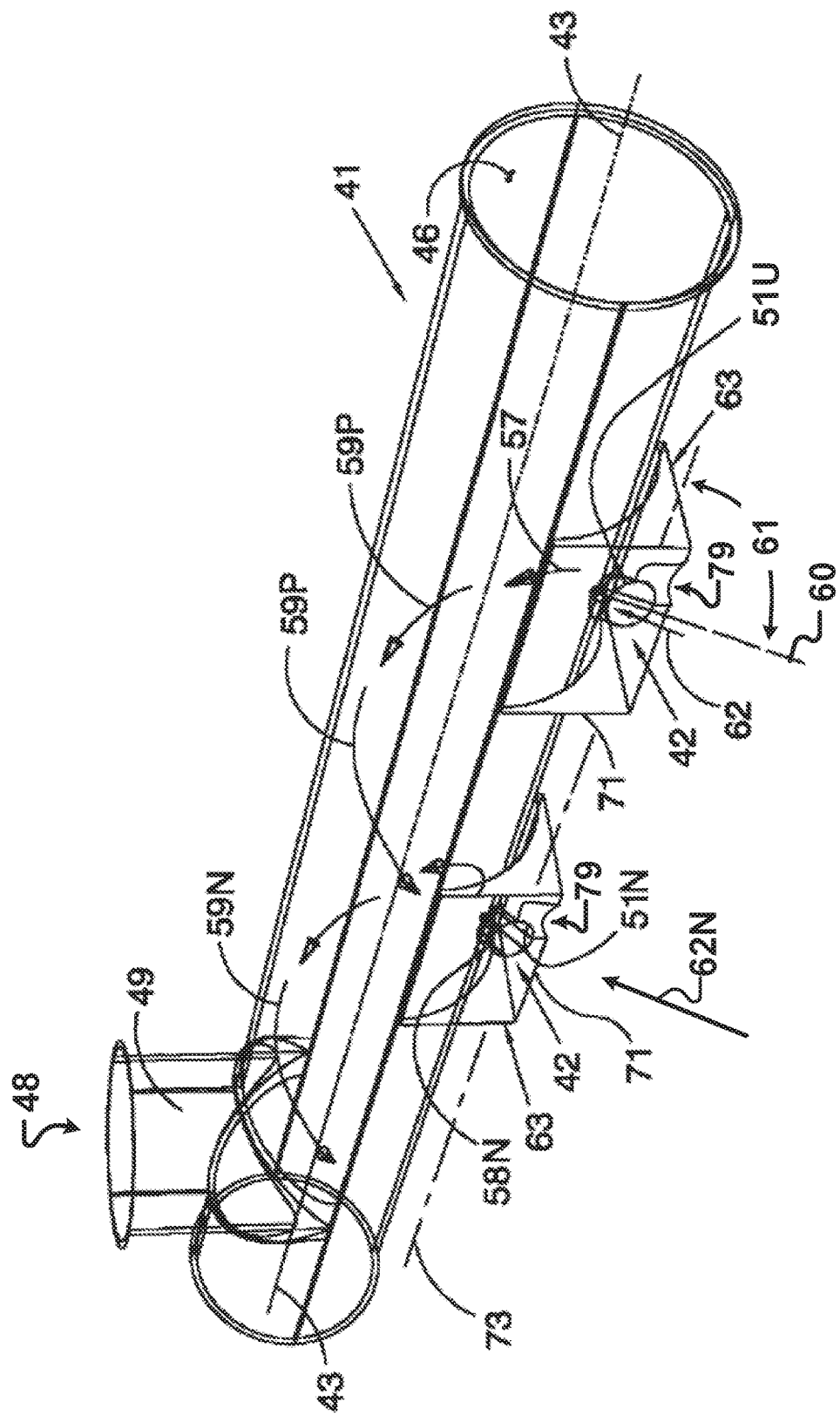
FIG. 11 is a three dimensional view of the header conduit and nozzle of FIG. 7 showing helical flow of the material and the sludge in the header conduit.

Referring to FIGS. 7-12, an embodiment of a header conduit 41 of the present invention may have passageways 51 positioned to provide both flow in the above-described tangential (or parallel) path 52 with respect to the arcuate inner flow surface 44 of the header conduit 41 and positioned at an acute angle 61 with respect to a longitudinal axis 43 of the header conduit 41 to form flow 62 into the passageways 51 (FIGS. 8, 10 and 11). Each passageway 51 (which may also be referred to as a tunnel, a shaft, or a duct) is formed through a flow director or nozzle 71 that is interconnected to the header conduit 41. The nozzle 71 may also be referred to as a port or a spout and is configured to accelerate liquid and sludge passing through the passageway 51 from a slow or stationary state in the basin to a faster state within the header conduit 41.

The passageways 51 are configured to collect liquid and sludge from a basin 20 and direct the liquid and sludge into the tangential path 52 within the header conduit 41. Specifically, the passageways 51 concentrate and direct a flow of liquid 22 and sludge 26 into a preferred path 57 within the header conduit.

As shown in FIG. 11, the flow 62 of incoming liquid 22 and the sludge 26 are thus provided with an axial component independently of the momentum of previously admitted liquid 22 and sludge 26 which flow in the helical flow path shown by arrow 59P. As shown in FIGS. 7-12, there is a thick section 63 on the outer surface 64 (FIG. 7) of the header conduit 41. The passageway 51 is provided through the thick section 63. As in the prior art passageway 35 shown in FIG. 5, the direction of flow in the passageway 51 is tangential (see arrows 55 in FIGS. 8-10) to the depicted circular cross section of the header conduit 41. However, as shown in FIGS. 10 and 11, the passageway 51 extends along an axis 60 both tangentially with respect to the inner flow surface 44 and at the acute angle 61 with respect to the longitudinal axis 43.

Referring to FIG. 8, as a result of this axial and tangential orientation of the passageway 51, as the portion 53 of the circular inner surface 44 starts to redirect the liquid 22 and the sludge 26 into the circular (or curved) path 57 as they flow past the outlet 58 of the passageway 51 into the header conduit 41, the total momentum of those incoming liquid 22 and sludge 26 has both tangential and axial vectors or directions. The smooth transition onto the inner flow surface 44 of the header conduit 41 is also achieved, and the incoming liquid 22 and sludge 26 immediately tend to assume the helical path 59 within the header conduit 41 without having to be redirected axially only by the previously admitted liquid 22 and sludge 26 (shown by arrow 59P in FIG. 11). As a result, more of the kinetic energy of the incoming liquid 22 and sludge 26 is used to flow the liquid 22 and the sludge 26 toward the main outlet 48 of the header conduit 41 than in the prior art pipes 29 shown in FIG. 1.

The helical flow 59 is shown in FIG. 11 continuing through 360 degrees. The passageway 51 having the tangential and axial orientation may be provided for each of the multiple entrances 42 which typically are provided to permit the liquid 22 and the sludge 26 to enter the header conduit 41. The liquid 22 and the sludge 26 previously admitted through one passageway 51 flows in the helical flow path 59P from the closed ends 46 of the header conduit, or from the next axial upstream passageway 51U (FIG. 11), toward the main outlet 48 of the header conduit 41 and past the outlet 58N of the next downstream passageway 51N. At the passageway outlet 58N (FIG. 11) of the next passageway 51N, the helically flowing previously admitted liquid 22 and sludge 26 (arrow 59P, FIG. 11) join the tangentially and axial flow 62 (FIG. 8) of newly incoming liquid 22 and sludge 26. The helical direction 59N of the newly incoming flow 62N merges smoothly with the previously admitted flow 59P and reinforces the previously admitted helical flow 59P. The helical momentum of the previously admitted flow 59P adds to the kinetic energy of the newly incoming flow 62N of the liquid 22 and the sludge 26 in the tangential and helical directions and fosters the flow of newly incoming liquid 22 and sludge 26 into the header conduit 41 and toward the main outlet 48 of the header conduit 41.

Referring to FIGS. 7-12 in more detail, the embodiment of the header conduit 41 is shown provided with the thick section 63 in the form of a nozzle 71 which may be mounted over each of many existing apertures 72 (FIG. 8) formed in a standard cylindrical pipe (e.g., header pipe 29 of FIG. 1), or the apertures 72 may be provided in a cylindrical header conduit 41 to function with the nozzles 71. In one embodiment, the apertures 72 are on a line 73 (FIG. 11) generally parallel to the longitudinal axis 43 between the closed ends 46. Optionally, the apertures are generally circular holes. However, in other embodiments, the apertures may have a shape that is not round. For example, in one embodiment, the apertures 72 have a shape that is generally elliptical or oval.

The apertures 72, in one embodiment, may have a diameter somewhat larger than the diameter of the passageway 51. Optionally, the apertures 72 may be between approximately one-quarter inch to approximately two inches. The diameter of the passageway 51 may be between approximately one-quarter inch and approximately four inches, for example. In one embodiment, the passageway has a diameter of between approximately one-half inch to approximately two inches. The sizes of the apertures 72 and of the passageways 51 are selected to achieve the above-described smooth merger of the flows 62 and 59P with no substantial interference from any edges of the passageway 51, the conduit 41 or the header pipe 49, and to achieve a generally smooth transition to the flow 57.

The header conduit 41 is optionally positioned on a carriage 28 (FIG. 13) with the apertures 72 facing forward, i.e., facing in the direction in which the carriage 28 moves the header conduit 41 into the sludge 26 (to the right in FIG. 8).

Each of the nozzles 71 has at least one passageway 51 positioned to provide the above-described tangential (or parallel) flow with respect to the inner flow surface 44 of the header conduit 41. The passageways 51 extend along an axis 60 (FIG. 10) which is oriented at the acute angle 61 with respect to the longitudinal axis 43 of the header conduit 41 to provide the flow 62 of the incoming liquid 22 and sludge 26 with an axial component independently of the momentum of the previously admitted flow 59P.

Figure 12A:
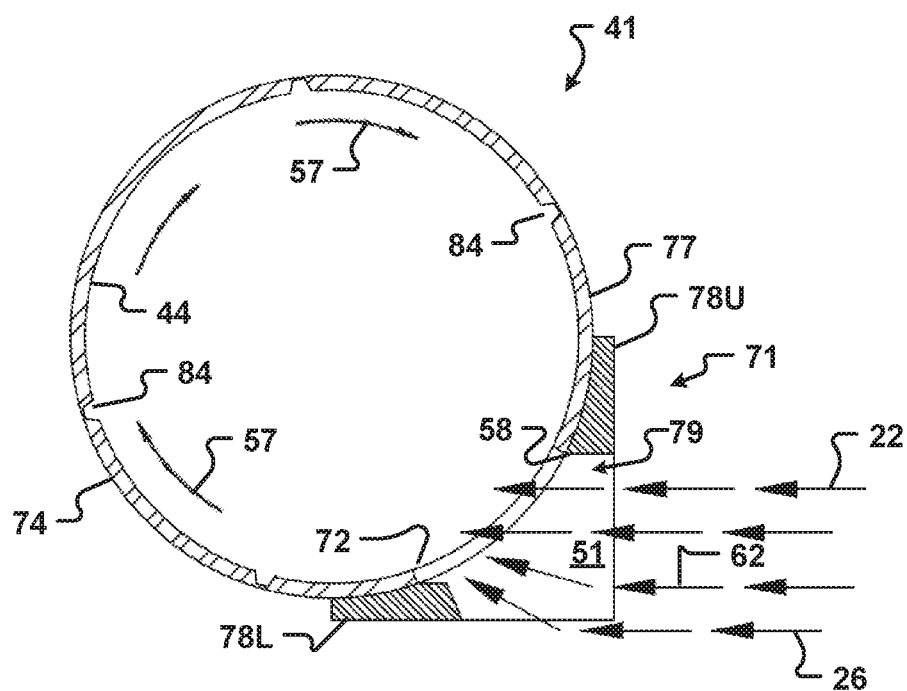
FIG. 12A is a cross sectional view similar to FIG. 8 showing an unobstructed flow through the nozzle of the present invention into the header conduit of FIG. 7.

As shown in FIG. 8, the wall 74 of the header conduit 41 is generally thin, such as 75 mils. The header conduit 41 may be configured to direct liquid and sludge into the helical path 59. In one embodiment, the interior flow surface 44 of the header conduit 41 includes one or more helical grooves 84, such as generally illustrated in FIG. 12A. The grooves 84 are similar to rifling of a gun barrel to promote, or improve, the helical flow 59 of the liquid and sludge. In one embodiment, the grooves 84 may wrap around the longitudinal axis 43 for at least a portion of length of the header conduit 41. Optionally, one or more of the grooves 84 may extend from a closed end 46 of the header conduit to the outlet 48.

Additionally, or alternatively, one or more vanes 86 may be interconnected to the interior flow surface 44. For example, and referring now to FIG. 12B, a vane 86 may extend inwardly from the interior flow surface 44. The vanes 86 may be configured to direct the liquid and sludge into the helical flow path 59. In one embodiment, the vanes 86 wrap around the longitudinal axis 43 one or more times. Optionally, the vanes 86 run continuously from the closed end 46 to the main outlet 48. Accordingly, in one embodiment, the vanes 86 have a shape similar to a helical spring with one edge interconnected to the interior flow surface 44. In another embodiment, one or more of the vanes run only a portion of the length of the header conduit.

Referring again to FIG. 10, in one embodiment, the angle 61 between the axis 60 of the passageway 51 and the longitudinal axis 43 is between approximately 30° and approximately 90°. In another embodiment, the angle 61 is at least approximately 40° and not greater than approximately 90°. Optionally, one or more of the passageways 51 leading to the header conduit 41 may have an axis 60 oriented at substantially the same angle 61 relative to the longitudinal axis. For example, passageways 51U and 51N illustrated in FIG. 11 may have substantially the same angles 61 relative to the longitudinal axis 43. Alternatively, at least one passageway 51 may have an axis 60 at an angle 61 with respect to the longitudinal axis that is different than an angle 61 of an axis 60 of another passageway 51.

In one embodiment, at least one passageway 51 has an axis 60 oriented at an angle 61 of between approximately 48° and approximately 52° with respect to the longitudinal axis 43. Additionally, or alternatively, in another embodiment at least one passageway 51 has an axis 60 that is oriented at an angle 61 of between approximately 42° and approximately 48° with respect to the longitudinal axis 43. In one embodiment, a first passageway 51 may optionally be at a first angle 61 and a second passageway 51 is at a second angle 61. In one embodiment, the second angle 61 is selected to alter the helical flow 59 within the header conduit 41. For example, the second angle 61 may be selected to increase or decrease the rate of flow 59, or change the direction of the path 57 of liquid and sludge within the header conduit 41 of the present invention.

In one embodiment, the header conduit 41 includes at least three nozzles 71. Each nozzle includes a passageway 51 extending along an axis 60 oriented at a predetermined angle 61 relative to the longitudinal axis 43. Optionally, each of the passageways 51 may have a unique angle 61 relative to the longitudinal axis. Specifically, a first passageway 51 has a first angle 61, a second passageway has a second angle, and a third passageway has a third angle.

The nozzle 71 forms the thick section 63 of the header conduit 41. In one embodiment, the nozzle 71 has a curved side 76, the curvature of which substantially matches that of the outer surface 77 of the header conduit 41. Optionally, the nozzle 71 is secured to the outer surface 77 of the header conduit 41 using waterproof adhesive, for example. In another embodiment, generally illustrated in FIG. 7, the nozzle 71 may be fixed to the header conduit 41 with a fastener 120, such as a threaded bolt secured by a nut 122. Additionally, or alternatively, the nozzle 71 can be secured to the header conduit by a weld, a rivet, a screw, a bolt, a mechanical interlocking attachment, and other known attachment methods.

The nozzles may be formed of a metal or a polymer. In one embodiment, the nozzles 71 are formed of a high density polyethylene, a nylon, and the like. The nozzle may be extruded or formed by an additive manufacturing process.

Referring to FIG. 8, in one embodiment, the nozzle 71 has generally planar or flat sides 78 which extend from the curved side 76 and form a corner positioned outwardly from the thin wall 74 to provide structure in which the passageway 51 is formed. The passageway 51 is drilled or otherwise formed through the corner of the nozzle 71 and extends from a nozzle inlet 79 formed through one or more of the flat sides 78 to the nozzle outlet 58. In one embodiment, the upper flat side 78U is approximately perpendicular to a first radius of the header conduit 41. Additionally, or alternatively, in another embodiment the lower flat side 78L is oriented approximately perpendicular to a second radius of the header conduit. Accordingly, in one embodiment the upper flat side 78U is approximately perpendicular to the lower flat side 78L.

The nozzle inlet 79 provides multiple pathways or directions for the liquid 22 and sludge 26 to enter into the passageway 51. More specifically, the nozzle inlet 79 facilitates the flow of liquid and sludge into the passageway from the upper flat side 78U and the lower flat side 78L as generally illustrated in FIG. 12A. In one embodiment, the nozzle inlet 79 to the passageway 51 intersects both the upper flat side 78U (the right side in FIG. 8) and the lower flat side 78L (the lower side in FIG. 8) so that a curved outlet portion 81 of the passageway 51 nearest the lower flat side 78L (FIG. 9) merges tangentially with the curved side 76 (FIG. 10) of the nozzle 71 and with the portion 53 (FIG. 8) of the inner surface 44 of the header conduit 41 which is first contacted by the incoming flow 62 upon flowing through the aperture 72 into the header conduit 41.

The length of the passageway 51 from the nozzle inlet 79 to the nozzle outlet 58 adjacent to such portion 53 of the inner surface 44 of the header conduit 41 is sufficient (e.g., between approximately one-half inch to approximately two inches) to establish the straight-line flow 62. The nozzle 71 may be provided for each of the multiple entrances 42 which typically are provided to permit the liquid 22 and the sludge 26 to enter the header conduit 41.

Figure 12B:
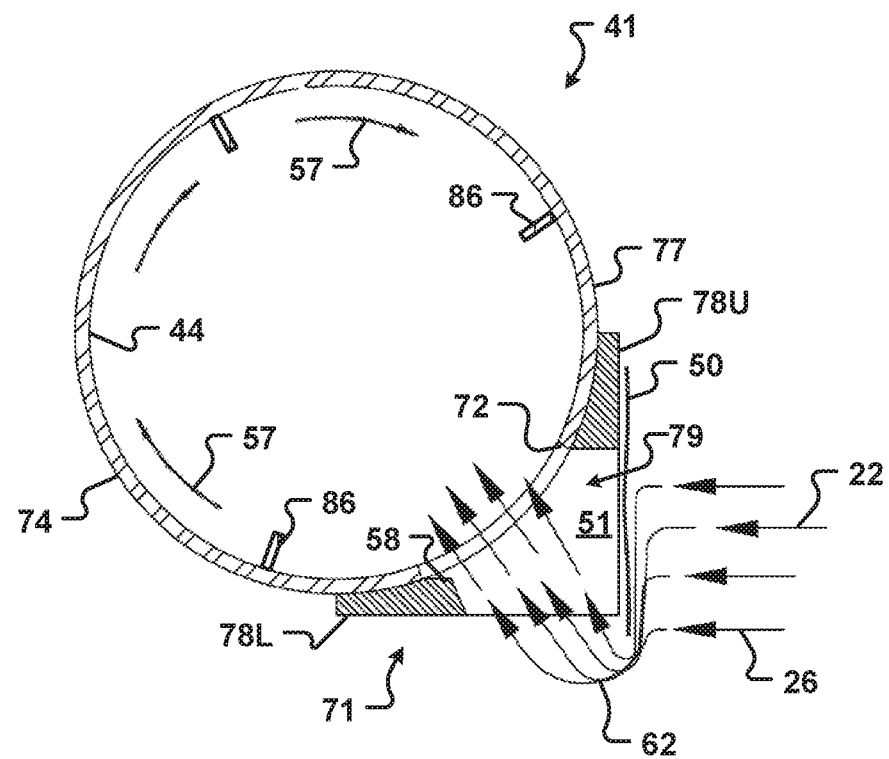
FIG. 12B is another cross sectional view of the header conduit shown in FIG. 12A showing an inlet of the nozzle partially blocked by flat material and with liquid and sludge flowing through an unobstructed portion of the inlet into the header conduit.

Referring now to FIG. 12A, a cross sectional side elevation view of a header conduit 41 is generally illustrated. The header conduit 41 may have an internal diameter of from approximately two to approximately four inches, for example. In one embodiment, the header conduit 41 has a diameter of approximately three inches. A nozzle 71 of the present invention including an embodiment of an inlet 79 is interconnected to the header conduit 41. The tunnel or passageway 51 through the nozzle 71 directs liquid 22 and sludge 26 in a curved or circular path 57 within the header conduit. However, unlike the entrance 32 to passageway 35 of the header pipe 29 of the prior art, such as illustrated in FIG. 6, the nozzle 71 illustrated in FIG. 12A includes the inlet 79 of the present invention that is configured to resist blocking or clogging. For example, as illustrated in FIG. 12B, the inlet 79 provides multiples pathways or entrances into the passageway. If one portion of the inlet 79 is obstructed by flat material 50, such as a plastic sheet, a bag (such as a plastic lunch bag or a plastic shopping bag), a leaf, a towel (or handi-wipe), algae, and similar materials, a flow 62 of liquid 22 and sludge 26 may enter the passageway 51 through another portion of the inlet 79 and flow into the header conduit 41. The liquid 22 and sludge 26 may then join the curved or circular path 57 of liquid and sludge within the header conduit. Referring again to FIG. 7, in one embodiment, the inlet 79 intersects both the upper side 78U and the lower side 78L of the nozzle 71.

Figure 13:
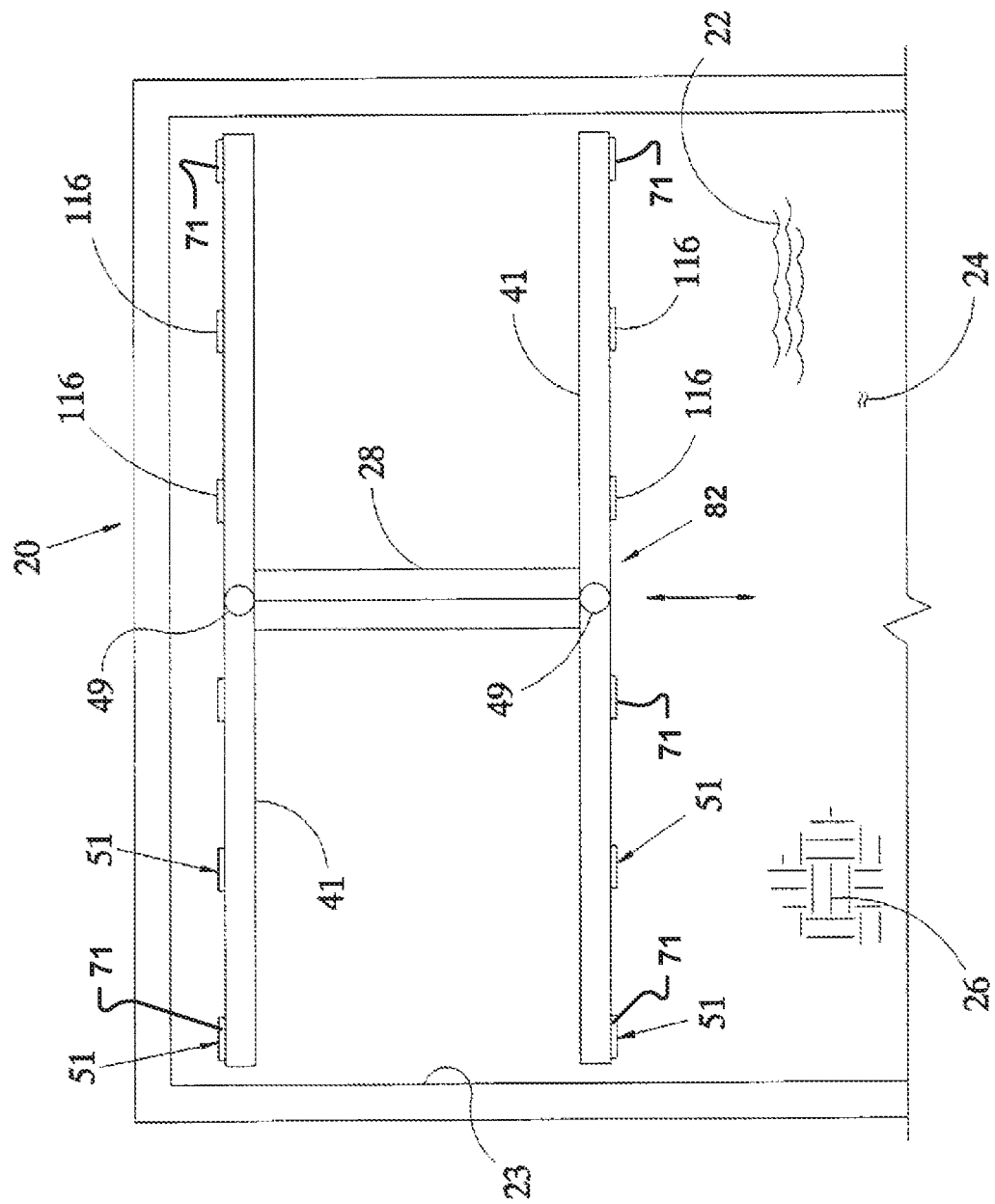
FIG. 13 is a plan view of a basin showing a traversing mechanism having a carriage movable from one of the ends of the basin to an opposite one of the ends of the basin to enable the header conduits of the present invention to collect material and liquid from the basin.

Referring now to FIG. 13, the header conduit 41 with a nozzle 71 of the present invention may be used by providing a pair of header conduits 41 mounted adjacently in a substantially parallel relationship on a carriage 28 of a sludge removing device 82 of the present invention. The carriage 28 reciprocates the header conduits 41 along the bottom 24 of the basin 20 and alternately into the sludge 26. One of the header conduits 41 faces one direction of travel, whereas the other header conduit 41 faces in the other direction of travel, so that regardless of the direction of travel of the carriage 28, there is at least one, and preferably many, passageways 51 with nozzles 71 facing the direction of travel for receiving the liquid 22 and the sludge 26 according to the principles of the present invention. In particular, a front 116 of each header conduit 41 faces the sludge 26 as that conduit 41 is moved into the sludge 26. The header conduit 41 is capable of supporting the helical flow 59 of the liquid 22 and the sludge 26 therein.

Figure 14:
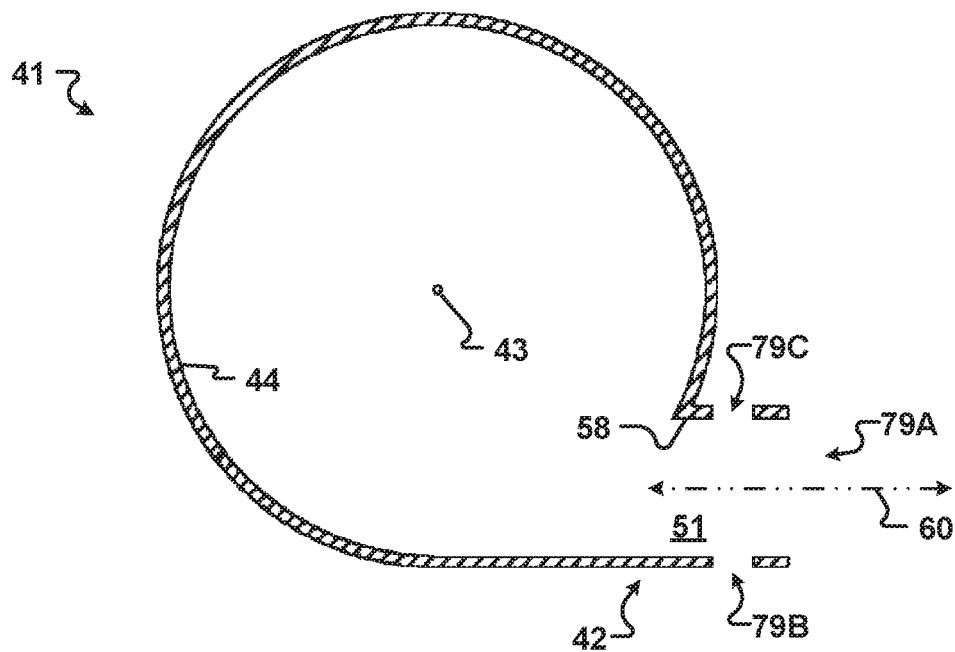
FIG. 14 is a cross-sectional view of a header conduit of another embodiment of the present invention include an entry orifice having a plurality of inlets into the header conduit.

Referring now to FIG. 14, a header conduit 41 with an entrance or orifice 42 of an embodiment of the present invention is generally illustrated. The header conduit 41 is similar to the prior art header piper 29 shown in FIGS. 5-6. However, the orifice 42 of the header conduit 41 of FIG. 14 is configured to resist or prevent blocking by flat material 50 that may be in the basin 20. Specifically, the orifice 42 provides a plurality of inlets 79 into the header conduit 41. In one embodiment, the orifice includes a first inlet 79A and one or more of a second inlet 79B and a third inlet 79C. In this manner, if one of the inlets 79 is blocked or obstruct by flat material 50, one or more other inlets 79 will not be obstructed by the flat material to provide a pathway for liquid 22 and sludge 26 to enter the passageway 51 and flow into the header conduit 41.

A passageway 51 of the orifice 42 generally extends along an axis 60. In one embodiment, the axis 60 is oriented at an acute angle with respect to a longitudinal axis 43 of the header conduit similar to the passageway 51 illustrated in FIG. 10.

Figure 15:
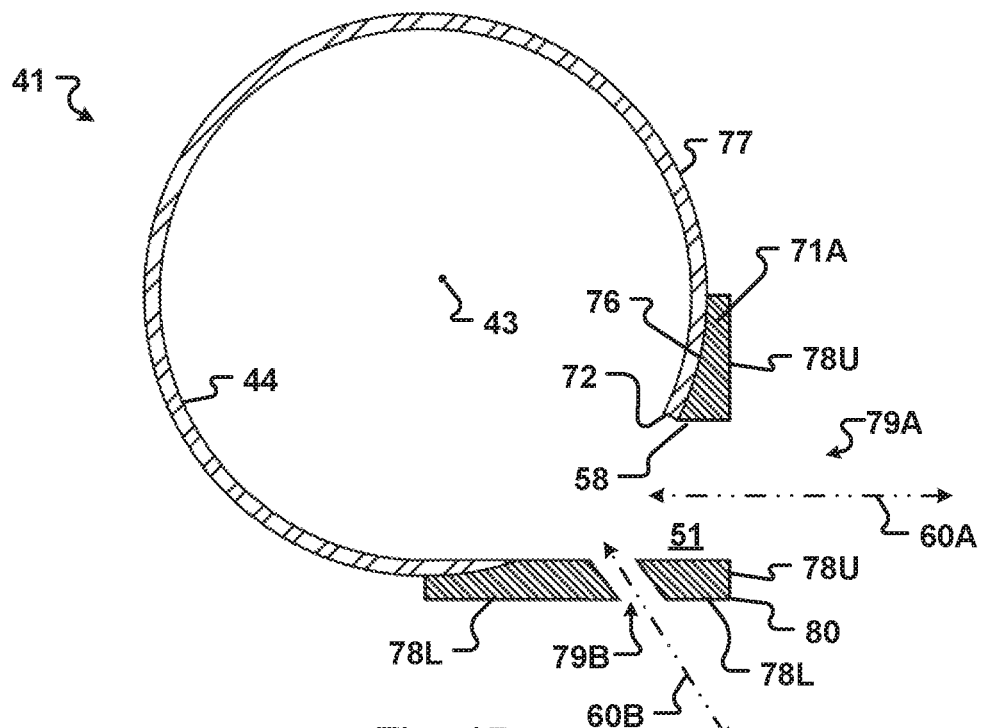
FIG. 15 is another cross-sectional view of a header conduit including a nozzle of yet another embodiment of the present invention, the nozzle including a passageway with at least two inlets configured to facilitate the flow of liquid and sludge into the header conduit even if one inlet is obstructed.
Figure 16:
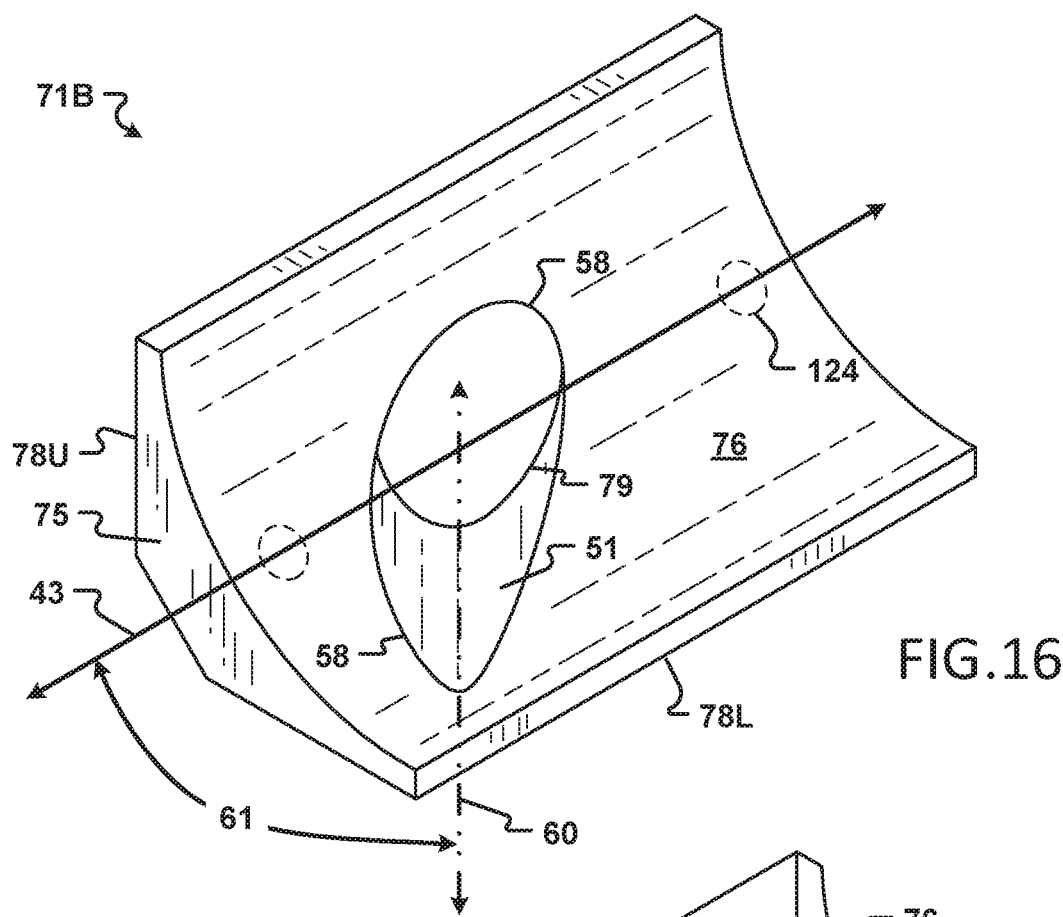
FIG. 16 is a top front perspective view of a nozzle according to one embodiment of the present invention which may be associated with a header conduit, the nozzle including a passageway to direct liquid and sludge both tangentially and at an acute angle relative to a longitudinal axis of the header conduit to promote helical flow in the header conduit.
Figure 17:
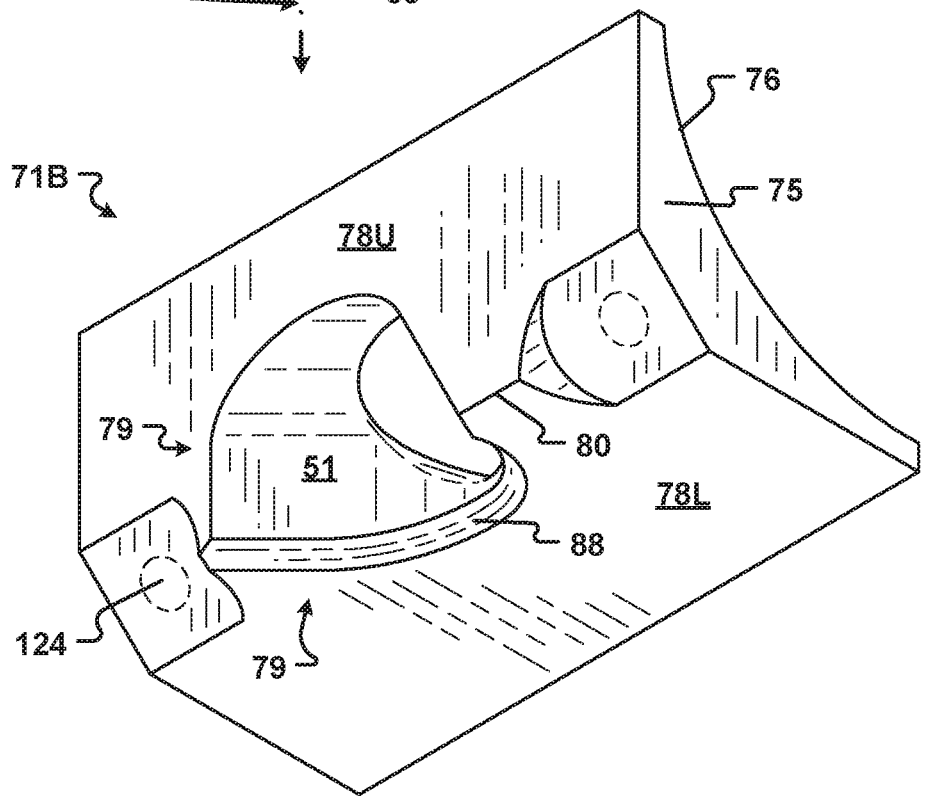
FIG. 17 is a bottom rear perspective view of the nozzle of FIG. 16.
Figure 18:
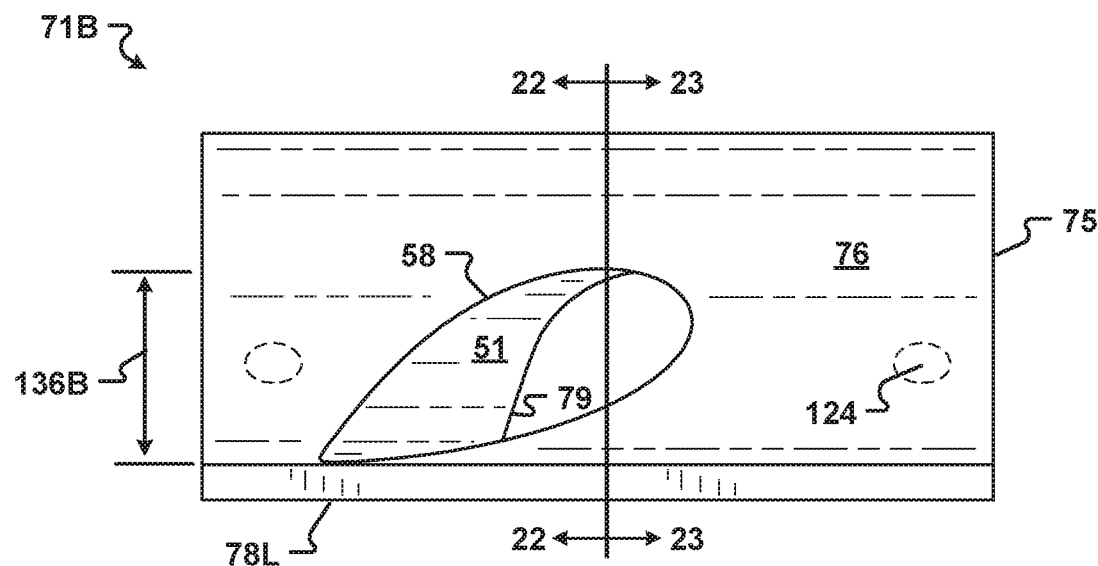
FIG. 18 is a front elevation view of the nozzle of FIG. 16.

Another embodiment of a header conduit 41 of the present invention is generally provided in FIG. 15. The header conduit 41 includes a nozzle 71A of another embodiment of the present invention that provides a plurality of pathways for liquid and sludge to flow into a passageway 51 through the nozzle. The nozzle 71A is similar to the nozzle 71 illustrated in FIG. 8 and includes many of the same or similar features. For example, nozzle 71A generally includes a curved surface 76 positioned proximate to a cylindrical outer surface 77 of the header conduit. An upper flat side 78U intersect a lower flat side 78L at a predetermined angle defining a corner 80. In one embodiment, flat side 78U is approximately perpendicular to flat side 78L, however, other orientations of the sides 78U, 78L are contemplated. The passageway 51 is formed through the nozzle 71A and provides a path for liquid and sludge to enter the header conduit 41 through an aperture 72 of the header conduit. Notably, the nozzle 71A includes a first inlet 79A and at least one secondary inlet 79B. The secondary inlet 79B provides an independent path for liquid and sludge to flow into the passageway 51. If the first inlet 79A is obstructed or blocked, such as by a piece of material 50 (as illustrated in FIG. 12B), liquid and sludge can flow into the passageway 51 to the header conduit 41 through the at least one secondary inlet 79B.

In one embodiment, the first inlet 79A has an interior diameter that is greater than a diameter of the secondary inlet 79B. In one embodiment, the first inlet 79A is formed through the upper flat side 78U. Optionally, the secondary inlet 79B is formed through the lower flat side 78L. In one embodiment, the secondary inlet 79B extends along an axis 60B that is oriented generally toward a longitudinal axis 43 of the header conduit. Specifically, in one embodiment the secondary inlet 79B is not oriented orthogonal to the lower flat side 78L. Optionally, the axis 60B of the secondary inlet 79B is oriented at an acute angle 61 with respect to the longitudinal axis 43. In this manner, the secondary inlet 79B can direct and/or accelerate liquid and sludge into a helical path 59 as generally illustrated in FIG. 11. Alternatively, in another embodiment the secondary inlet 79B is oriented approximately perpendicular to the lower flat side.

Referring now to FIGS. 16-22, still another embodiment of a nozzle 71B of the present invention is generally illustrated. The nozzle 71B is configured to resist blocking by providing a plurality of pathways for liquid and sludge to flow into a passageway 51 through the nozzle. More specifically, the nozzle 71B includes a passageway 51 that is more resistant to blocking by flat material 50 than the passageway 35 of the prior art entrance passageway illustrated in FIG. 6. The nozzle 71B is similar to the nozzle 71 described in conjunction with FIGS. 7-12 and includes many of the same or similar features, dimensions, and angles.

The nozzle 71B generally includes a curved surface 76 configured to be positioned proximate to a cylindrical outer surface 77 of a header conduit 41. The curved surface 76 has a predetermined radius of curvature 126 (shown in FIG. 21). In one embodiment, the radius of curvature 126 is between approximately 1 inch and 4 inches. In another embodiment, the radius of curvature of the curved surface 76 is approximately 1.5 inches. One of skill in the art will appreciate that the curved surface may have a radius of curvature 126 selected to fit an outer surface of a header conduit of any diameter. In one embodiment, the curved surface 76 is glued or otherwise interconnected to a cylindrical outer surface of a header conduit.

An upper flat side 78U of the nozzle 71B intersects a lower flat side 78L at a predetermined angle defining a corner 80. In one embodiment, the upper flat side 78U is approximately perpendicular to the lower flat side 78L. Alternatively, the sides 78U, 78L may intersect at an angle other than 90°. The upper flat side 78U defines a height 128 of the nozzle. In one embodiment, the height 128 is between approximately 1 inch and approximately 4 inches. Optionally, the height may be approximately 1.69 inches. Similarly, the lower flat side 78L defines a thickness 130 of the nozzle. The thickness 130 may be approximately 1 inch to approximately 4.5 inches. In one embodiment, the thickness is approximately 1.75 inches. Although various dimension are provided for the nozzle, one of skill in the art will appreciate that the nozzle may have any height or thickness selected to fit to a header conduit of any diameter.

An aperture 124 may optionally be formed through the nozzle 71B. The aperture 124 is configured to receive a fastener to interconnect the nozzle 71B to a header conduit similar to the fastener 120 shown in FIG. 7. In one embodiment, the aperture 124 is formed through one or more of the upper and lower flat sides 78U, 78L. Optionally, the aperture 124, illustrated in hidden lines in FIGS. 20, 21, may be oriented to be substantially aligned with a diameter of a header conduit to which the nozzle 71B will be interconnected.

Figure 19:
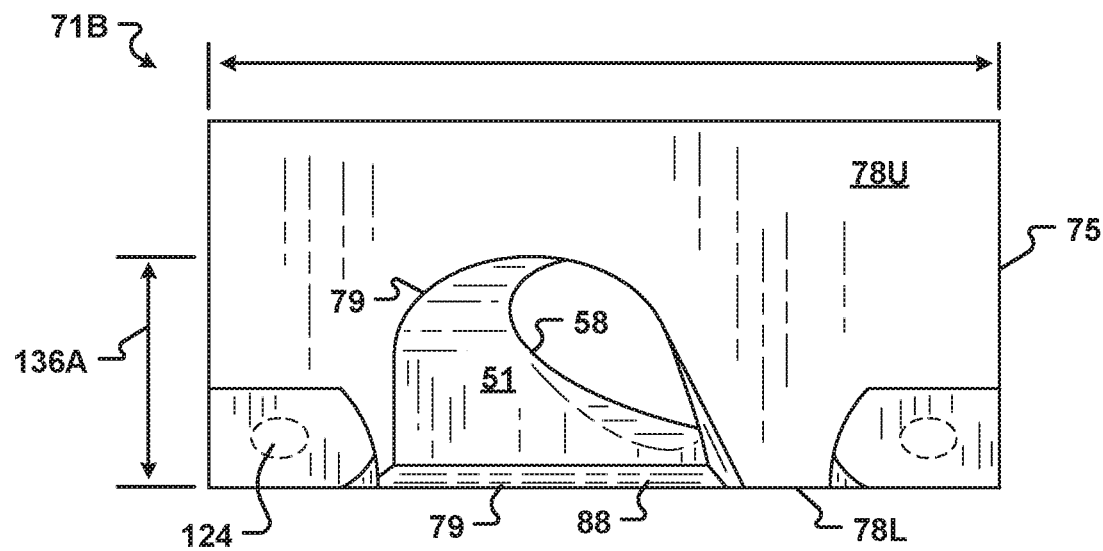
FIG. 19 is a rear elevation view of the nozzle of FIG. 16.
Figure 20:
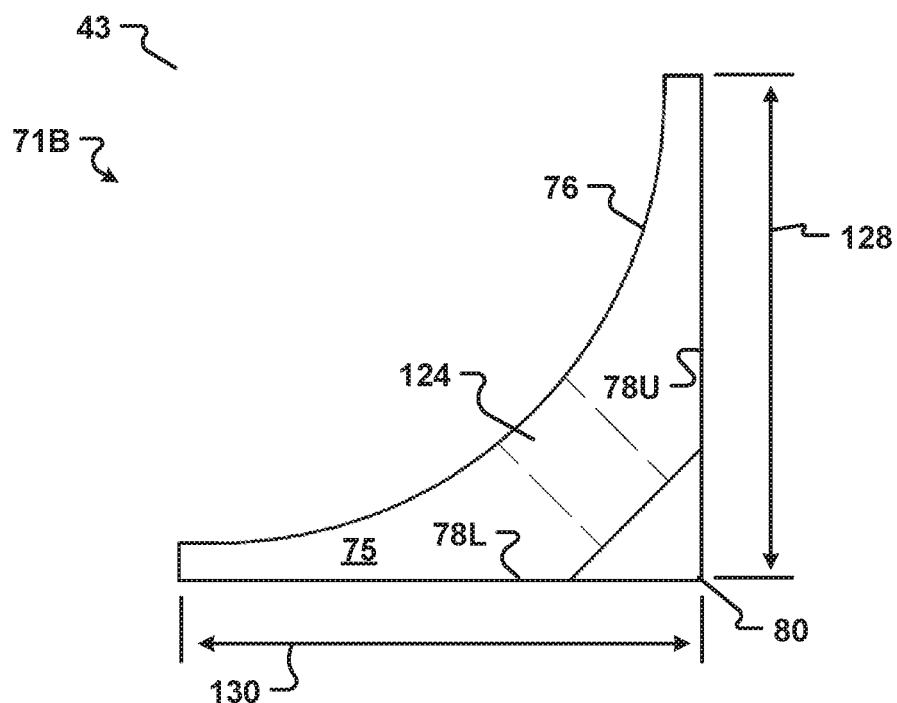
FIG. 20 is a right elevation view of the nozzle of FIG. 16.
Figure 21:
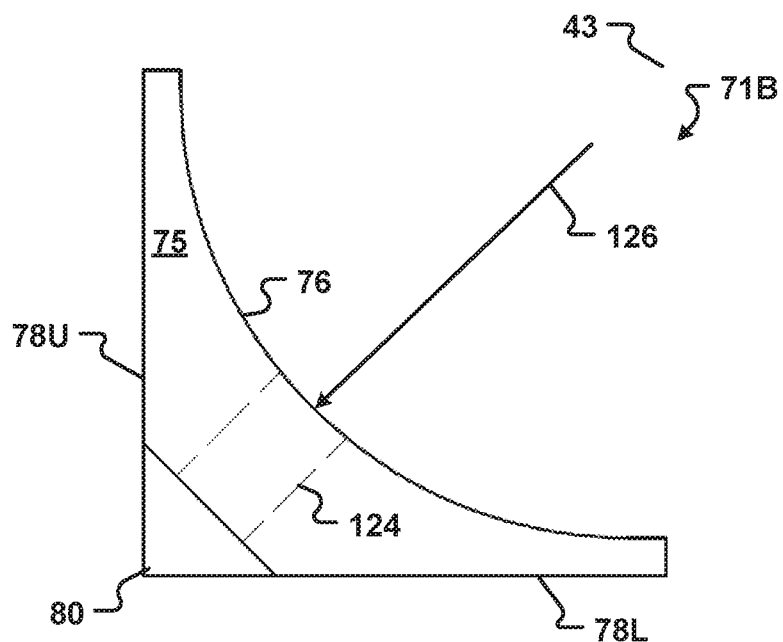
FIG. 21 is a left elevation view of the nozzle of FIG. 16.
Figure 22:
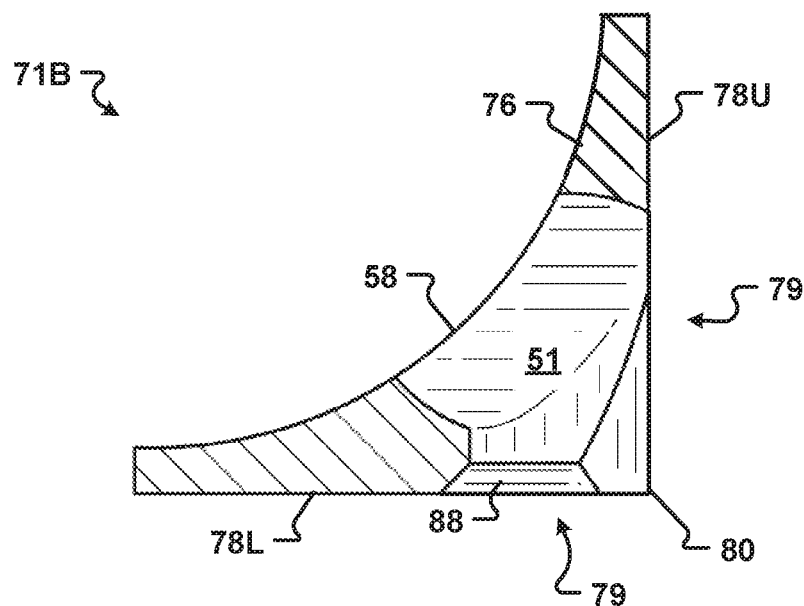
FIG. 22 is a right cross-sectional elevation view of the nozzle taken along line 22-22 of FIG. 18.
Figure 23:
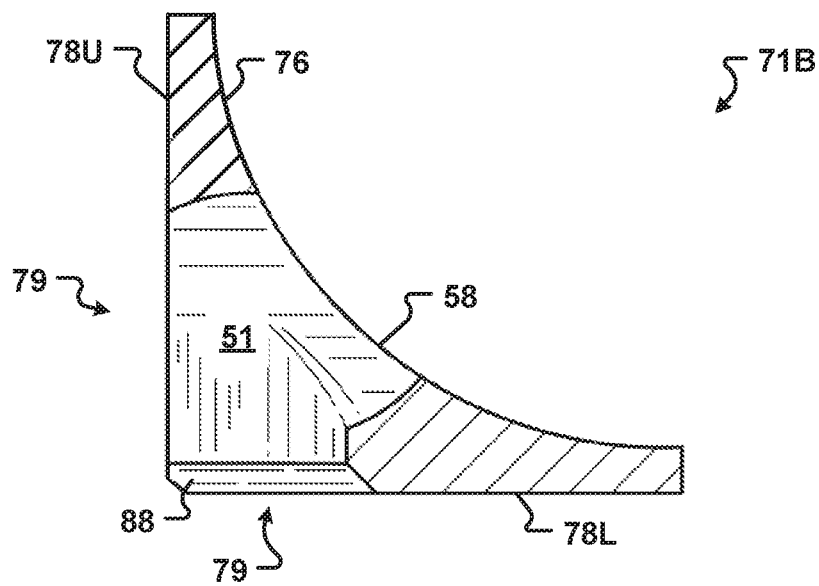
FIG. 23 is a left cross-sectional elevation view of the nozzle taken along line 23-23 of FIG. 18.

The nozzle 71B has a predetermined length 132, shown in FIG. 19, extending between opposing endwalls 75. In one embodiment, the length 132 is between approximately 2 inches and approximately 6 inches. In another embodiment, the length may be approximately 3.5 inches.

A passageway 51 is formed through the nozzle 71B and provides a path for liquid and sludge to enter the header conduit 41 through an aperture of the header conduit. The passageway 51 generally extends from an inlet 79 formed in the upper and lower flat sides 78U, 78L to an outlet 58 formed through the curved surface 76.

Optionally, the inlet 79 may include a beveled edge 88. In one embodiment, the beveled edge 88 is formed in the lower flat side 78L. The beveled edge 88 can prevent, or reduce the possibility of debris and flat materials from hanging or catching on the nozzle 71B or a sharp edge of the inlet 79. For example, the beveled edge 88 can have a rounded or curved cross section that provides fewer surfaces for flat materials to engage. In one embodiment, the beveled edge 88 can be oriented to help direct fluid into the helical path within the header conduit.

Figure 24:
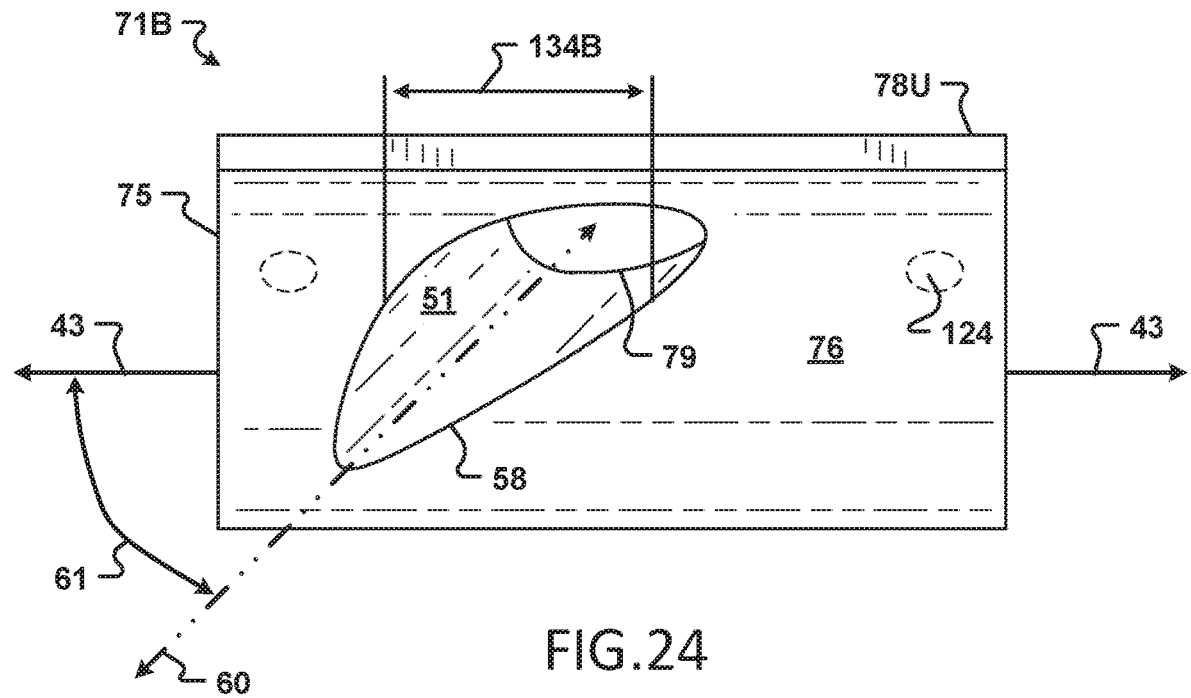
FIG. 24 is a top plan view of the nozzle of FIG. 16.
Figure 25:
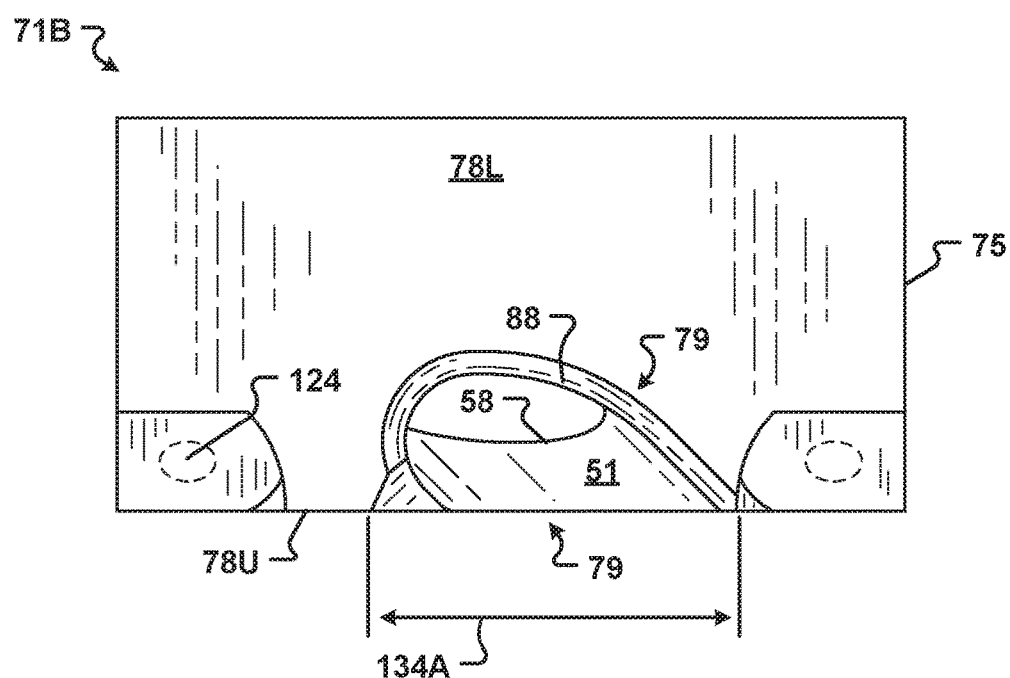
FIG. 25 is a bottom plan view of the nozzle of FIG. 16.

The passageway 51 is configured to accelerate liquid and sludge passing there-through from a slow or stationary state in a basin to a faster state within a header conduit 41. In one embodiment, the passageway 51 decreases in one or more dimension from the inlet 79 to the outlet 58. For example, and referring now to FIGS. 24 and 25, a maximum width 134A of the passageway proximate to the inlet 79 can be greater than a maximum width 134B of the passageway proximate to the outlet 58. In another embodiment, generally illustrated in FIGS. 18, 19, the passageway has a height 136A proximate to the inlet 79 that is greater than a height 136B proximate to the outlet 58.

The passageway 51 extends along an axis 60 oriented at a predetermined angle 61 to a longitudinal axis 43. The angle 61 is selected to direct liquid and sludge passing through the passageway 51 into a circular 57 or helical 59 path within a header conduit 41 such as generally illustrated in FIG. 11. The angle 61 may be between approximately 10° and approximately 90°. Optionally, in another embodiment, the angle 61 is at least approximately 40° and not greater than approximately 90°. In one embodiment, the passageway 51 has an axis 60 oriented at an angle 61 of between approximately 48° and approximately 52° with respect to the longitudinal axis 43. Alternatively, in another embodiment the passageway 51 has an axis 60 that is oriented at an angle 61 of between approximately 42° and approximately 48° with respect to the longitudinal axis 43.

The nozzle 71B may be formed of a metal or a polymer. In one embodiment, the nozzle 71B is formed of a high density polyethylene, a nylon, and the like. Optionally, the nozzle 71B may be produced by a 3-D printer or other additive manufacturing processes.

To provide additional background, context, and to further satisfy the written description requirements of 35 U.S.C. § 112, the following references are incorporated by reference in their entireties to further describe header conduits and basins for collecting materials and other apparatus commonly associated therewith: U.S. Pat. Nos. 2,646,889; 2,980,934; 3,959,838; 4,401,576; 4,144,174; 4,193,871; 4,276,165; 5,108,586; 5,427,685; 5,911,241; 5,914,049; 6,045,709; 6,951,620; 7,021,472; 7,462,290; 8,657,901; 9,067,727; 9,764,257; U.S. Patent Pub. 2004/0222170; U.S. Patent Pub. 2005/0279701; U.S. Patent Pub. 2006/0175251; U.S. Patent Pub. 2013/0118618; European Patent Pub. 0544096; European Patent Pub. 2335799; International Patent Pub. WO 1998/012145; and International Patent Pub. WO 2011/067336.

While various embodiments of the system have been described in detail, it is apparent that modifications and alterations of those embodiments will occur to those skilled in the art. It is to be expressly understood that such modifications and alterations are within the scope and spirit of the present disclosure. It should be understood, of course, that the present invention is not necessarily limited to the particular embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as, additional items.

What is claimed is:

1. A conduit for collecting material from a collector surface on which the material rests, the conduit having a collector section bounded by opposite closed ends, the collector section having an internal flow surface provided with an aperture formed through the internal flow surface for admitting the material, the internal flow surface being provided with a longitudinal axis extending between the opposite closed ends, the conduit comprising:

a nozzle with a passageway intersecting the aperture and being external to the internal flow surface, the passageway being elongated and including an inlet that intersects a first flat side and a second flat side of the nozzle, the first flat side being oriented generally perpendicular to a first radius of the conduit and the second flat side oriented generally perpendicular to a second radius of the conduit, wherein the inlet reduces the likelihood of clogging due to flat material blocking the flow of the material through the inlet into the passageway.

2. The conduit of claim 1, wherein the passageway tangentially intersects the internal flow surface of the conduit.

3. The conduit of claim 1, wherein the first flat side is approximately perpendicular to the second flat side.

4. The conduit of claim 1, wherein the nozzle includes a beveled edge.

5. The conduit of claim 1, wherein the passageway extends along a passageway axis that is oriented at an acute angle with respect to the longitudinal axis.

6. The conduit of claim 5, wherein the acute angle of the passageway axis is between approximately 40° and approximately 90° with respect to the longitudinal axis.

7. The conduit of claim 5, further comprising a second nozzle with a second passageway that intersects a second aperture formed through the internal flow surface of the conduit, the second passageway extending along a second passageway axis that is oriented at a second acute angle with respect to the longitudinal axis that is different than the acute angle of the passageway axis.

8. The conduit of claim 1, wherein the aperture has a dimension of from approximately 0.25 inches to approximately 2 inches.

9. The conduit of claim 1, wherein the nozzle comprises one or more of a polymer, a polyethylene, a high density polyethylene, a nylon, and similar materials.

10. The conduit of claim 1, wherein the nozzle is secured to the conduit by a mechanical fastener.

11. The conduit of claim 1, wherein the flat material is a leaf.

12. A method of collecting sludge from the bottom of a basin, comprising:

providing a sludge collection conduit with opposite ends, a sludge outlet between the opposite ends, and a cylindrical internal sludge collection surface extending along a longitudinal axis between the opposite ends of the sludge collection conduit and intersecting the sludge outlet; and causing the sludge to enter the sludge collection conduit in paths through nozzles at a plurality of locations spaced along the sludge collection conduit between the opposite ends, wherein each nozzle has a passageway therein for directing the sludge in one of the paths from the basin into the sludge collection conduit, wherein an inlet of the passageway intersects at least a first exterior flat side and a second exterior flat side of the nozzle to reduce the likelihood of clogging due to flat material blocking the entry of the sludge into the passageway.

13. The method of claim 12, wherein the first exterior flat side is approximately perpendicular to the second exterior flat side.

14. The method of claim 12, wherein the paths are:

tangential to the cylindrical internal sludge collection surface;

at an acute angle with respect to the longitudinal axis; and facing the outlet to provide a helical flow of the sludge in the sludge collection conduit toward the sludge outlet.

15. The method of claim 14, further comprising reducing a pressure applied to the sludge outlet to cause the sludge to flow from the basin into the passageway of the nozzle and from the passageway in the path tangential to the cylindrical internal sludge collection surface and at the acute angle with respect to the longitudinal axis.

16. A flow director for collecting material from a surface of a collector and directing the material into a header conduit, comprising:

a body extending between a first endwall and a second endwall and including a first side, a second side, and a curved surface configured to be positioned adjacent to an exterior surface of the header conduit;

a passageway formed through the body and exiting through the curved surface, the passageway extending along a passageway axis that is oriented at an acute angle with respect to a longitudinal axis of the body; and an inlet to the passageway that intersects the first and second sides, wherein the inlet reduces the likelihood of a leaf spanning the first and second sides and obstructing the flow of material through the inlet and into the passageway.

17. The flow director of claim 16, wherein the inlet includes a beveled edge.

18. The flow director of claim 16, wherein the acute angle is between approximately 40° and 90°.

19. The flow director of claim 16, wherein the passageway is configured to direct the material into a helical path within the header conduit.

20. The flow director of claim 16, wherein the curved surface has a radius of curvature of between approximately 1 inch and approximately 2 inches.

* * * * *